(12) United States Patent
Seear

(10) Patent No.: US 10,407,120 B2
(45) Date of Patent: Sep. 10, 2019

(54) CYCLE FRAME FLUID RESERVOIR

(71) Applicants: Ventum LLC, Miami Beach, FL (US); Peter Kenneth Seear, Brookfield (AU)

(72) Inventor: Peter Kenneth Seear, Brookfield (AU)

(73) Assignee: Ventum LLC, Miami Beach, FL (US)

( * ) Notice: Subject to any disclaimer, the term of this patent is extended or adjusted under 35 U.S.C. 154(b) by 0 days.

(21) Appl. No.: 15/508,919

(22) PCT Filed: Sep. 4, 2015

(86) PCT No.: PCT/AU2015/050524
§ 371 (c)(1),
(2) Date: Mar. 4, 2017

(87) PCT Pub. No.: WO2016/033658
PCT Pub. Date: Mar. 10, 2016

(65) Prior Publication Data
US 2017/0203809 A1    Jul. 20, 2017

Related U.S. Application Data

(63) Continuation of application No. 14/844,917, filed on Sep. 3, 2015, now abandoned.

(30) Foreign Application Priority Data

Sep. 5, 2014 (AU) ................................ 2014903546
May 13, 2015 (AU) ................................ 2015901742
Sep. 3, 2015 (WO) ................. PCT/AU2015/050520

(51) Int. Cl.
*B62K 19/40* (2006.01)
*B62J 9/00* (2006.01)
(Continued)

(52) U.S. Cl.
CPC ............... *B62K 19/40* (2013.01); *B62J 9/005* (2013.01); *B62J 9/006* (2013.01); *B62J 99/00* (2013.01);
(Continued)

(58) Field of Classification Search
CPC ............ B62J 9/001; B62J 9/005; B62K 19/40
See application file for complete search history.

(56) References Cited

U.S. PATENT DOCUMENTS 3,777,955 A   12/1973   Davies
4,386,721 A    6/1983   Shimano
(Continued)

FOREIGN PATENT DOCUMENTS

EP      0041372 A2    12/1981
WO   1994026579 A1    11/1994
WO   2007143608 A2    12/2007

OTHER PUBLICATIONS

International Preliminary Report on Patentability, dated Mar. 7, 2017, International Application No. PCT/AU2015/050520, filed Sep. 3, 2015, 11 pages.

(Continued)

*Primary Examiner* — Kevin Hurley
(74) *Attorney, Agent, or Firm* — Giordano Law LLC

(57) ABSTRACT

A fluid reservoir for a cycle frame, the cycle frame including a top tube extending from a head end to a seat mounting, the fluid reservoir including a body defining a cavity for containing a fluid, the body positioned in abutment with at least a part of the top tube in use, and wherein the body is shaped so that the fluid reservoir and the at least a part of the top tube cooperate to define an aerodynamic profile.

13 Claims, 23 Drawing Sheets

(51) Int. Cl.
*B62J 99/00* (2009.01)
*B62K 3/04* (2006.01)
*B62K 3/06* (2006.01)
*B62K 3/10* (2006.01)
*B62K 19/02* (2006.01)
*B62K 19/16* (2006.01)
*B62K 19/36* (2006.01)

(52) U.S. Cl.
CPC ............... *B62K 3/04* (2013.01); *B62K 3/06* (2013.01); *B62K 3/10* (2013.01); *B62K 19/02* (2013.01); *B62K 19/16* (2013.01); *B62K 19/36* (2013.01)

(56) References Cited

U.S. PATENT DOCUMENTS

| | | | |
|---|---|---|---|
| RE33,295 E | | 8/1990 | Trimble |
| 5,119,978 A | * | 6/1992 | Kalamaras .............. A45F 3/16 215/388 |
| 5,143,390 A | | 9/1992 | Goldsmith |
| 5,201,442 A | * | 4/1993 | Bakalian ............... A45F 3/16 222/608 |
| 5,443,139 A | * | 8/1995 | Scott ..................... B62J 31/00 184/15.1 |
| 5,497,920 A | | 3/1996 | Moeller |
| 7,114,738 B1 | | 10/2006 | Chen |
| 7,988,175 B2 | * | 8/2011 | White .................... B62J 9/001 224/425 |
| 8,308,179 B2 | * | 11/2012 | Cote .................... B62K 19/30 280/288.3 |
| 9,186,691 B2 | | 11/2015 | Carrozza |
| 2005/0252850 A1 | | 11/2005 | Ali |
| 2010/0059565 A1 | | 3/2010 | Cote |
| 2010/0090439 A1 | | 4/2010 | White |
| 2012/0097722 A1 | | 4/2012 | Kahan |
| 2012/0261897 A1 | | 10/2012 | Cote |

OTHER PUBLICATIONS

U.S. Patent Office Non-Final Office Action, dated Jun. 13, 2016, U.S. Appl. No. 14/844,917, filed Sep. 3, 2015, 26 pages.
International Search Report, dated Oct. 14, 2015, International Application No. PCT/AU2015/050524, filed Sep. 4, 2015, 4 pages.
IP Australia Search Information Statement, completed Oct. 14, 2015, International Application No. PCT/AU2015/050524, filed Sep. 4, 2015, 2 pages.

* cited by examiner

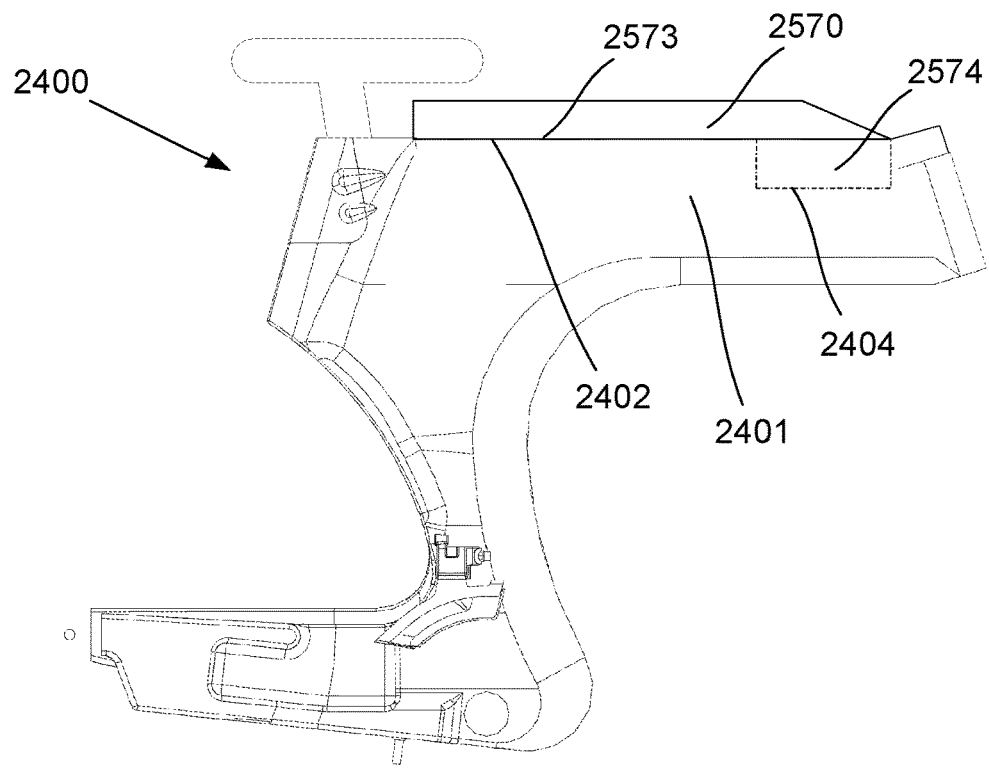
FIG. 21
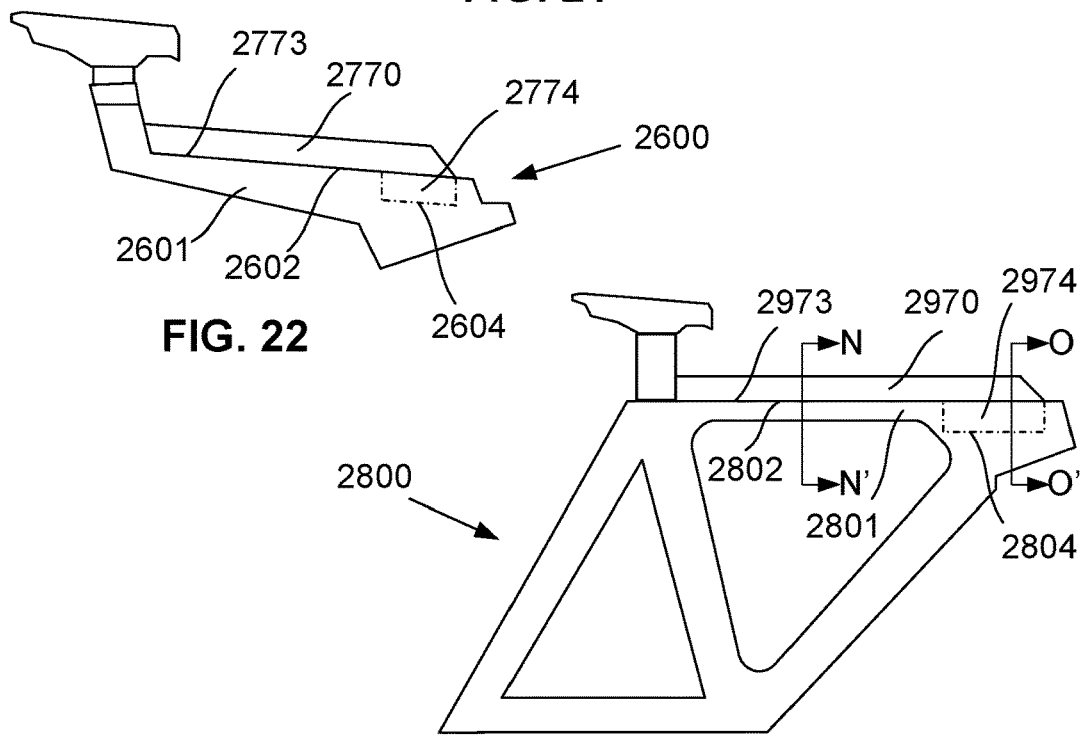
FIG. 22
FIG. 23

CYCLE FRAME FLUID RESERVOIR

BACKGROUND OF THE INVENTION

This invention relates to a fluid reservoir for use with a cycle frame and a cycle frame incorporating a fluid reservoir.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

It is well known that aerodynamic drag can have a significant impact on energy usage during cycling. In particular, an increase in drag can result in reduced overall speeds and increased time to cover a given distance, which is particularly important during competitive cycling.

Many attempts have been made to reduce the effective drag of bicycles by modifying the design of the cycle frame, including through the use of tapered frame members, and specific designs of frame. Similarly, many professional riders undergo wind tunnel training in order to improve their riding posture and hence reduce drag. Whilst these measures have proved effective, additional improvement gains are always being sought.

Whilst racing, riders will also need to consume significant quantities of fluids. Typically this is achieved through a combination of water bottles mounted to the frame and water supplied to riders whilst on the move, for example at water stations. The frame mounted water bottles tend to have a generally cylindrical shape and can therefore contribute significantly to drag, whilst water stations can slow riders when they attempt to collect water whilst passing, or in the event that water is not successfully collected, leading to dehydration during the ride.

SUMMARY OF THE PRESENT INVENTION

In one broad form the present invention seeks to provide a fluid reservoir for a cycle frame, the cycle frame including a top tube extending from a head end to a seat mounting, the fluid reservoir including a body defining a cavity for containing a fluid, the body positioned in abutment with at least a part of the top tube in use, and wherein at least one of the top tube and the body are shaped so that the fluid reservoir and the at least a part of the top tube cooperate to define an aerodynamic profile.

Typically the reservoir includes a recess extending at least part way along an edge surface of the reservoir, and wherein the recess is adapted to receive at least one of:
  a) at least part of an underside of the top tube;
  b) at least part of an upper side of the top tube; and,
  c) at least part of a rear end of the top tube.

Typically the body is positioned at least partially in abutment with a trailing edge surface of the cycle frame.

Typically at least part of a leading edge surface of the reservoir conforms to a shape of at least part of a leading edge of the frame to define a substantially continuous aerodynamic surface.

Typically at least part of a leading edge surface of the body conforms to a shape of at least part of a leading edge of the frame to define a substantially continuous aerodynamic surface.

Typically a leading edge surface of the body abuts against a shroud, the shroud conforming to a shape of at least part of a leading edge of the frame to define a substantially continuous aerodynamic surface.

Typically at least part of a leading edge surface of the reservoir is curved so as to flare outwardly from at least part of the frame in a direction of travel of the cycle.

Typically at least part of the body is tapered in a direction of travel of the cycle.

Typically at least part of a trailing edge of the body is tapered.

Typically the body includes a recess located on at least part of a leading edge surface of the body.

Typically the cycle frame includes a head end, and wherein the body includes a recess that is adapted to receive at least part of a rear side of the head end.

Typically the cycle frame includes a down tube extending from a head end to a bottom bracket, and wherein the body includes a recess that is adapted to receive at least part of a rear side of the down tube.

In one broad form the present invention seeks to provide a fluid reservoir for a cycle frame, the fluid reservoir including a body defining a cavity that contains a fluid in use, the reservoir including a recess extending at least part way along an edge surface of the reservoir, the recess conforming to the shape of part of the frame to receive the part of the frame therein.

Typically the cycle frame includes a bottom bracket and the body is adapted to abut against at least part of the bottom bracket.

Typically a trailing edge surface of the body is adapted to conform to a shape of a rear wheel of the cycle.

Typically the fluid reservoir is at least partially transparent to thereby allow fluid levels within the fluid reservoir to be observed.

Typically the fluid reservoir includes one or more reservoir portions that contain respective fluids in use.

Typically the fluid reservoir includes a lower surface extending downwardly to define a sump so that fluid drains into the sump.

Typically the reservoir includes a drinking tube extending from the fluid reservoir, the drinking tube terminating within the sump thereby allowing fluid to be removed from within the sump.

Typically the fluid reservoir is configured for use on a V-frame cycle.

Typically the top tube includes a reservoir recess and the fluid reservoir is removably mounted within the reservoir recess in use.

Typically the cycle frame further includes:
  a) a connecting portion extending from one of the head end or the seat mounting to a bottom bracket mounting; and,
  b) a wheel mounting portion extending from the bottom bracket mounting to a wheel mounting end.

Typically the reservoir recess is provided in one of:
  a) an upper surface of the top tube;
  b) a lower surface of the top tube; and,
  c) a lateral side surface of the top tube.

Typically a first reservoir recess is provided in a first lateral side surface of the top tube and a second reservoir recess is provided in a second lateral side surface of the top tube, wherein the first and second reservoir recesses are separated by a longitudinally extending web and first and second fluid reservoirs are removably mounted within the first and second reservoir recesses in use.

Typically the reservoir recess extends at least one of:
a) substantially along a length of the top tube; and,
b) part way down the connecting portion.

Typically the top tube includes a substantially elongate through-opening extending from a first side of the top portion to a second side of the top portion and wherein the fluid reservoir is removably mounted within the through-opening in use.

Typically the fluid reservoir includes a refill port.

Typically the refill port is covered by a plurality of flexibly resilient leaves which, in use, deflect out of the way to allow fluid to enter the refill port.

Typically the refill port is disposed through an upper surface of the fluid reservoir.

In another broad form the present invention seeks to provide a cycle frame including a top tube extending from a head end to a seat mounting and a fluid reservoir including a body defining a cavity for containing a fluid, the body positioned in abutment with at least a part of the top tube in use, and wherein at least one of the top tube and the body are shaped so that the fluid reservoir and the at least a part of the top tube cooperate to define an aerodynamic profile.

In a further broad form the present invention seeks to provide a cycle frame including:
a) a top tube extending from a head end to a seat mounting, the top tube including a reservoir recess;
b) a connecting portion extending from one of the head end or the seat mounting to a bottom bracket mounting;
c) a wheel mounting portion extending from the bottom bracket mounting to a wheel mounting end; and,
d) a fluid reservoir at least part of which is removably mounted within the reservoir recess in use, wherein the fluid reservoir is shaped so that the fluid reservoir and top tube cooperate to define an aerodynamic profile.

Typically the reservoir recess includes a seat mounting face including apertures extending through a seat mounting that receive seat mounting bolts, the seat mounting bolts threadingly engaging a removable seat clamp to thereby clamp a seat post within the seat mounting.

In a further broad form the present invention seeks to provide cycle frame including:
a) a top tube extending from a head end to a seat mounting, the top tube including a substantially elongate through-opening extending from a first side of the top tube to a second side of the top tube;
b) a connecting portion extending from the seat mounting to a bottom bracket mounting;
c) a wheel mounting portion extending from the bottom bracket mounting to a wheel mounting end; and,
d) a fluid reservoir removably mounted within the through-opening in use, wherein the fluid reservoir is shaped so that the fluid reservoir and top tube cooperate to define an aerodynamic profile.

The separate broad forms of the invention and their respective features can be used independently, interchangeable or in conjunction, and reference to separate broads forms is not intended to be limiting.

BRIEF DESCRIPTION OF THE DRAWINGS

An example of the present invention will now be described with reference to the accompanying drawings, in which:—

FIG. 21 is a partial schematic side view of another example of a cycle frame;

FIG. 22 is a partial schematic side view of another example of a cycle frame;

FIG. 23 is a partial schematic side view of another example of a cycle frame;

DETAILED DESCRIPTION OF THE PREFERRED EMBODIMENTS

Figure 1:
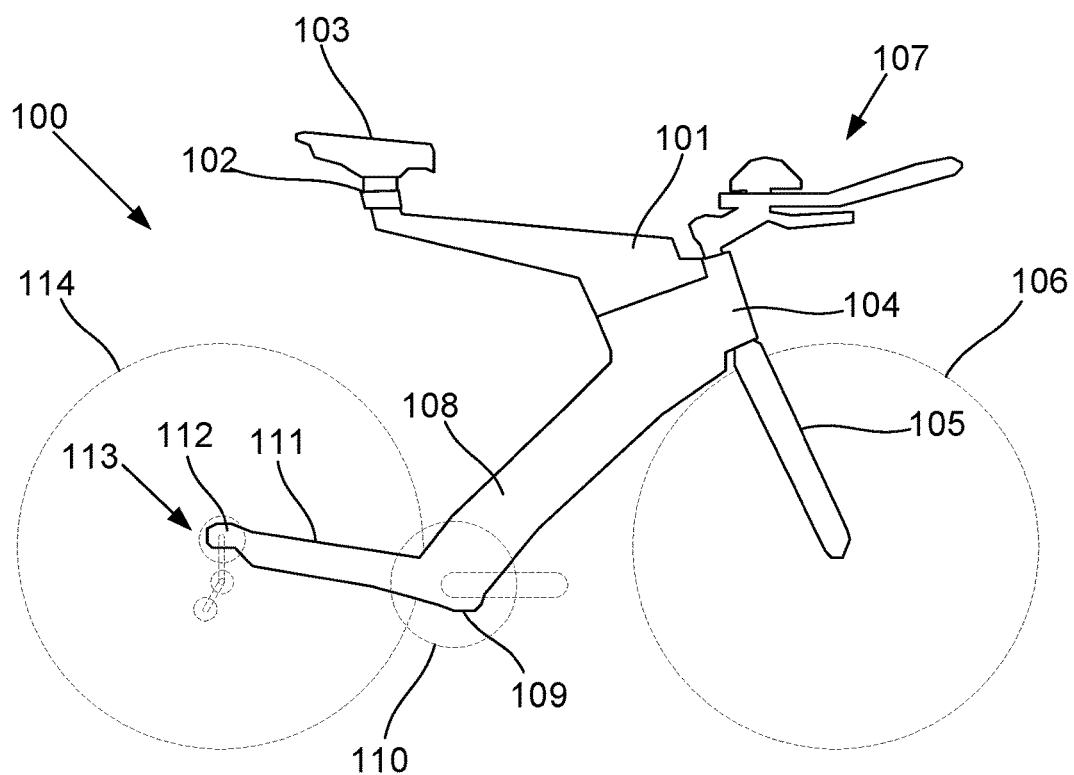
FIG. 1 is a schematic side view of an example of a cycle frame.

An example of a cycle frame will now be described with reference to FIG. 1.

In this example the cycle frame 100 includes a top tube 101 extending from a seat mounting 102, which supports a seat 103, to a head portion 104. The head portion 104 typically supports forks 105, which in use support a front wheel 106, and which are coupled via a stem (not shown) to handlebars 107, such as aero bars used in racing. The head portion 104 is typically coupled by a down tube 108 to a bottom bracket 109 that supports a crank set including chain rings 110, as well as a crank and pedals, that in use drive a chain (not shown). A front derailleur is also typically provided coupled to the down tube 108 for selectively engaging the chain with one of the chain rings 110. Chain stays 111 extend from the bottom bracket 109 to a wheel mounting 112, which in use supports a gear cassette and rear derailleur mechanism 113 and rear wheel 114.

In one example, the cycle frame is part of a Dimond™ triathlon or racing bike, in which case each of the top tube 101, head portion 104 and down tube 108 are profiled to maximise aerodynamic efficiency. In particular, these typically flare outwardly from a leading edge and tapering towards a trailing edge to thereby optimise airflow and minimise wind resistance. In the case of the top tube 101, as this is angled downwardly towards the head portion, tapering typically occurs towards the underside edge. However, it will be appreciated from the following that this is only one example of the form of cycle frame with which the fluid reservoir can be used, and this is not intended to be limiting.

It is known that such arrangements are optimised for aerodynamic efficiency thereby reducing drag allowing riders to reach a higher top speed and/or ride with greater efficiency. In practice however, users typically attached water bottles either to the handlebars 107, for a example between elbow rests of the aero bars, or rearwardly of the seat. When position in front of the handlebars, this causes disruption of airflow over the frame rearwardly of the bottles, whilst positioning the bottles rearwardly of the seats leads to the creation of eddies and turbulence in airflow exiting the frame, also significantly increasing drag. This is exacerbated by the fact that water bottles are typically cylindrical in shape and do not themselves result in clean airflow around the bottle.

An example of a fluid reservoir will now be described with reference to FIGS. 2A to 2F.

In this example, the fluid reservoir 200 includes a body 210 defining a cavity 211 for containing a fluid in use. The body 210 includes at least one recess extending at least part way along an edge surface of the body, the recess conforming to the shape of part of the cycle frame to receive the part of the frame therein.

In the current example, the fluid reservoir includes two recesses 212, 214 provided in upper and leading edge surfaces 213, 215 respectively. These allow the fluid reservoir to be mounted to the cycle frame against an underside of the top tube 101 and a rear side of the head portion 104, such that the underside of the top tube 101 and trailing edge of the head portion 104 are received in the recesses 212, 214, respectively.

The above described arrangement provide a number of benefits. In particular, this allows the body 210 to be positioned at least partially in abutment with a trailing edge surface of the cycle frame, which means that airflow over the frame is then directed immediately over the outer surface of the fluid reservoir body 210, in a continuous manner, thereby preventing the creation of turbulent flow between the cycle frame and body, which in turns leads to increases in drag.

Additionally, the frame and body can cooperate to define an aerodynamic profile such that airflow over the surface of the cycle frame and the body is smooth. In one example, this achieved by arranging at least part of a leading edge surface of the reservoir, and in particular the body to conform to a shape of at least part of a leading edge of the frame. Thus, in this example, the leading edge surface 215 is curved so as to flare outwardly from at least part of the frame in a direction of travel of the cycle, and substantially conforms to the leading edge of the head portion 104, so as to define a substantially continuous aerodynamic surface. However, as an alternative, this could be achieved using a shroud as will be described in more detail below.

Similarly, the upper edge surface 213 is curved and substantially conforms to the upper edge of the top tube 101.

Figure 2A:
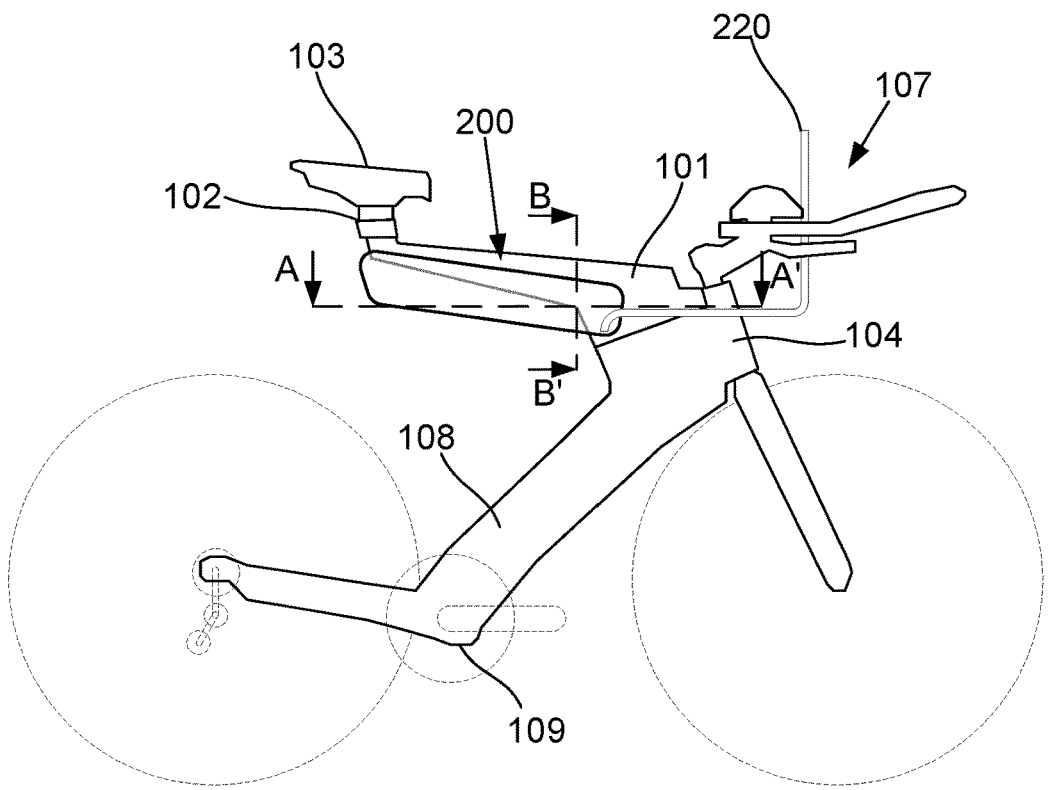
FIG. 2A is a schematic side view of an example of a fluid reservoir mounted to the cycle frame of FIG. 1.
Figure 2B:
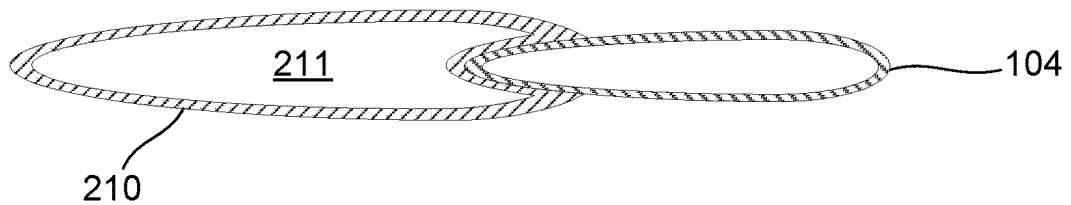
FIG. 2B is a schematic cross sectional view through the line A-A'.
Figure 2C:
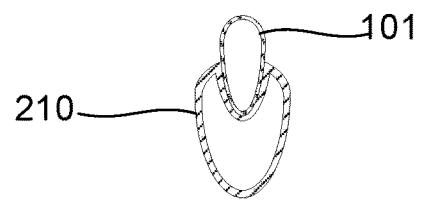
FIG. 2C is a schematic cross sectional view through the line B-B'.
Figure 2D:
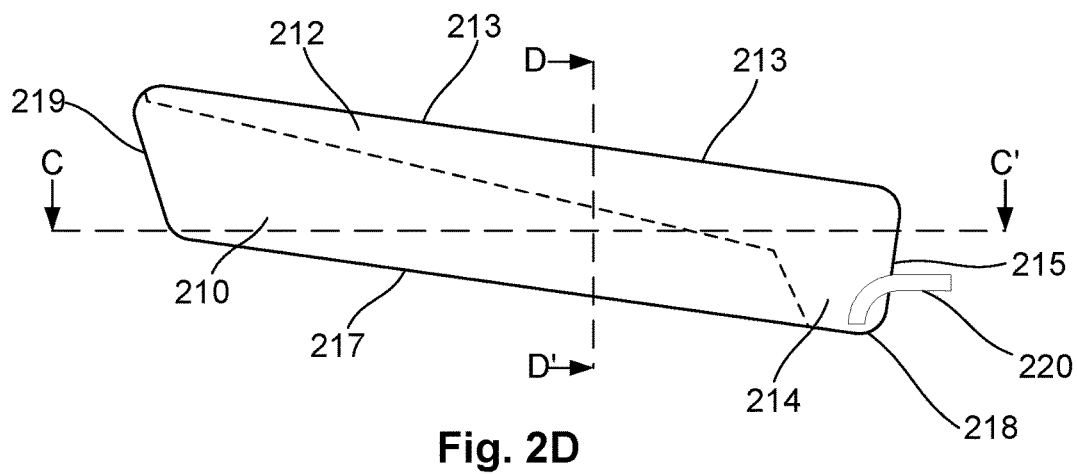
FIG. 2D is a schematic side view of the fluid reservoir of FIG. 2A.
Figure 2E:
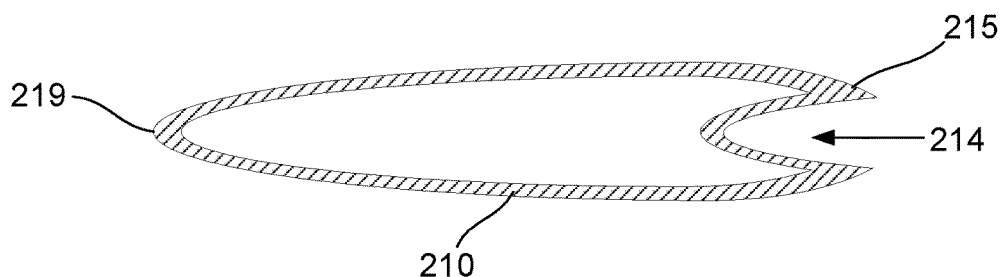
FIG. 2E is a schematic cross sectional view through the line at C-C' of FIG. 2D.
Figure 2F:
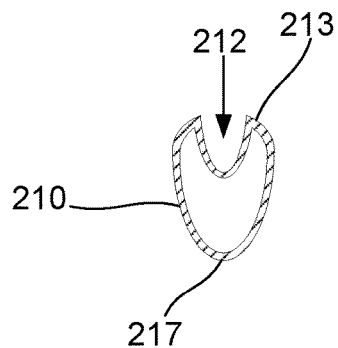
FIG. 2F is a schematic cross sectional view through the line D-D' of FIG. 2D.

Thus, as will be apparent from the cross sectional views of FIGS. 2B and 2C, airflow around the head portion 104 and top tube 101 is directed outwardly and around the body 210 with minimal disturbance, in particular avoiding the creation of eddies or turbulent airflow.

Additionally, the body is tapered, at least in a direction of travel of the cycle, and more specifically towards a trailing edge 219, as shown in FIG. 2B, so as to create smooth airflow from the trailing edge of the fluid reservoir which in turn further reduces drag.

The recess is typically located on at least a part of a leading edge of the body, which in this case includes the recess 214, which extends along the entire length of the leading edge surface 215. This facilitates connection of the fluid reservoir body 210 to the trailing edge of the head portion 104. Similarly, in this example the body recess 212 extends along an upper edge surface 213 allowing the recess 212 to receive part of an underside of the top tube 101, so that the fluid reservoir is in abutment with and accommodates at least part of both the top tube 101 and head portion 104. This enables the fluid reservoir to form an integral aerodynamic surface with both of the top tube 101 and head portion 104 thereby minimising drag. As will be described in more detail below alternative examples are possible.

The fluid reservoir typically also includes a lower surface 217 that extends downwardly to define a sump 218. In use, a drinking tube 220 extends from a position proximate the handlebars 107 and terminates within the sump 218, allowing fluid to be extracted directly from the sump 218, thereby enabling a rider to drink substantially all the fluid within the reservoir without shifting their position on the bike, which is important in maintaining a minimum drag profile during riding.

The body 210 has a generally elongate rectangular shape, stretching along the underside of the top tube, thereby maximising the fluid cavity volume, and hence the amount of fluid that can be stored, whilst having tapering and tear drop profiles in horizontal and vertical planes, to thereby maximise the aerodynamic efficiency as described above.

The body 210 can be made of any suitable material and this could include any one or more of high-density polyethylene (HDPE), low-density polyethylene (LDPE), copolyester, polypropylene, or the like. In one example, the body is transparent allowing a rider to visually assess an amount of available fluid remaining for consumption during a race. The fluid reservoir can also be divided internally, for example using dividing wall (not shown) running along an internal length of the cavity 211, allowing the fluid reservoir to be divided into respective portions, allowing different fluids such as isotonic drink and water to be delivered via different drinking tubes.

The body 210 could be mounted on the frame using a variety of techniques. In one example, this can be achieved solely through interaction between the recess and the frame, so that the body is mounted using a friction fit, interference fit, clip fit, or the like. A further alternative is the use of magnetic coupling or the like, which can be used in addition to or as an alternative to other mounting techniques.

In any event, in the above described example, the body recesses receive at least part of the underside of the top tube and a trailing edge of the head portion. However, it will be appreciated that other alternative arrangements can also be provided in accordance with the above described principles and a number of further examples will now be described. For the purpose of these examples, similar reference numerals will be used to denote similar features, and these will not be described in detail unless they have an impact on the operation of the fluid reservoir.

A second example of a fluid reservoir will now be described with reference to FIGS. 3A to 3C.

In this example, the fluid reservoir 300 includes a body 310 defining a fluid cavity 311, and a drinking tube 320. The body 310 is generally trapezoidal in shape and is positioned in use, rearwardly of the head portion 104, between the top tube 101 and the down tube 108. The fluid reservoir would typically include recesses 312, 314, 316 along each of upper, leading and lower edge surfaces 313, 315, 317, which respectively receive an underside of the top tube 101, a trailing edge of the head portion 104 and a rear upper side of the down tube 108.

Accordingly, in this arrangement the body 310 includes recesses that receive each of the top tube 101, head portion 104 and down tube 108. The upper, leading and lower edge surfaces 313, 315, 317 are curved to generally conform to the upper, leading and lower edges of these components of the frame, whilst the body 310 again tapers along its length towards the trailing edge 319, thereby removing gaps between the fluid reservoir and frame, as well as providing an aerodynamic profile to facilitate smooth airflow and reduce drag.

Figure 4A:
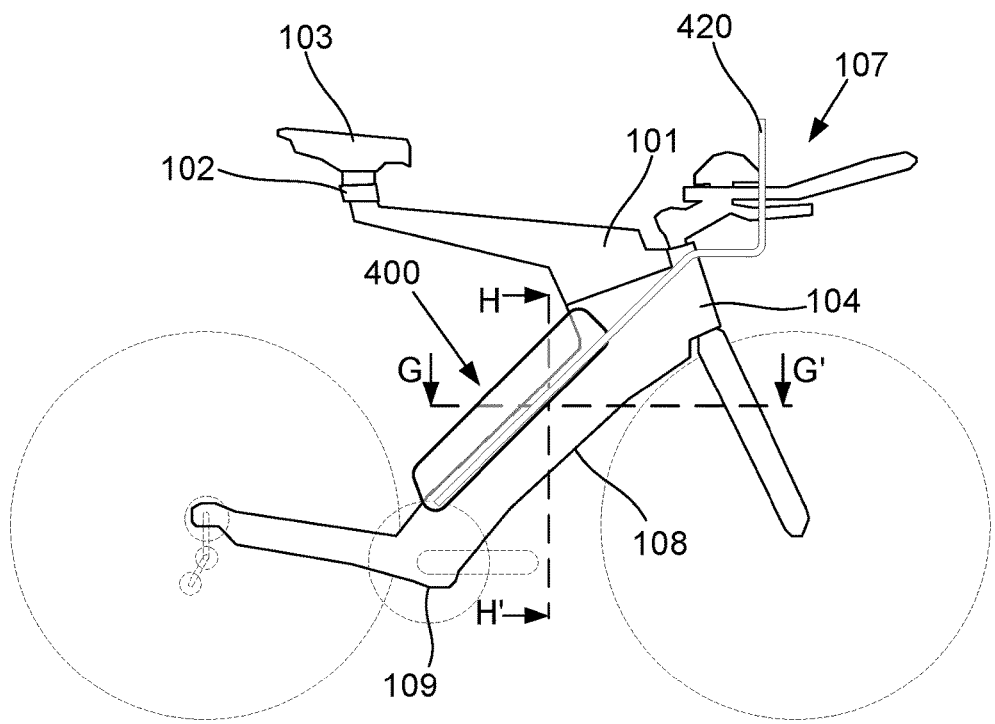
FIG. 4A is a schematic side view of a third example of a fluid reservoir mounted to the cycle frame of FIG. 1.
Figure 4B:
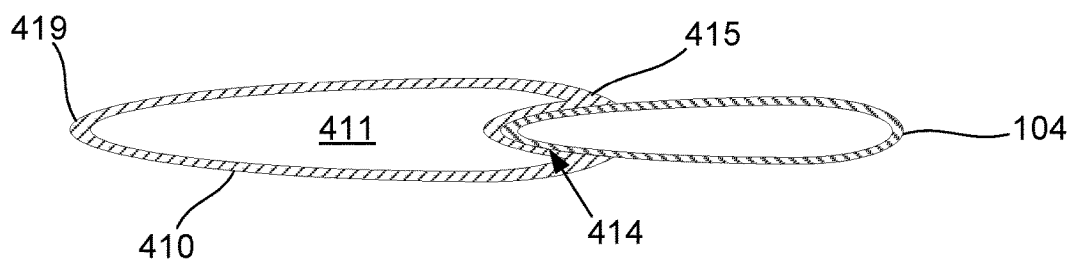
FIG. 4B is a schematic cross sectional view along the line G-G' of FIG. 4A.
Figure 4C:
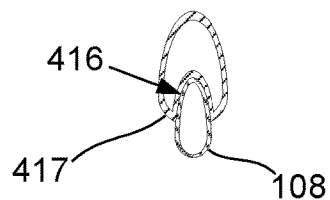
FIG. 4C is a schematic cross sectional view along the line H-H' of FIG. 4A.

A third example of a fluid reservoir will now be described with reference to FIGS. 4A to 4C.

In this example, the fluid reservoir 400 includes a body 410 defining a fluid cavity 411, and recesses 414, 416 provided on leading and underside edge surfaces 415, 417. The recesses engage a trailing edge of the head portion 104 and an upper rearward surface of the downtube 108 respectively, so that the fluid reservoir is supported on a rear side of the down tube 108 and abuts against and receives a trailing edge of the head portion 104. In this instance, the body 210 is elongate and generally rectangular in shape so that it extends along substantially the entire down tube 108. The body includes a tear drop shape, with curved underside and leading edges 417, 415, tapering towards a rearward trailing edge 419.

Figure 5A:
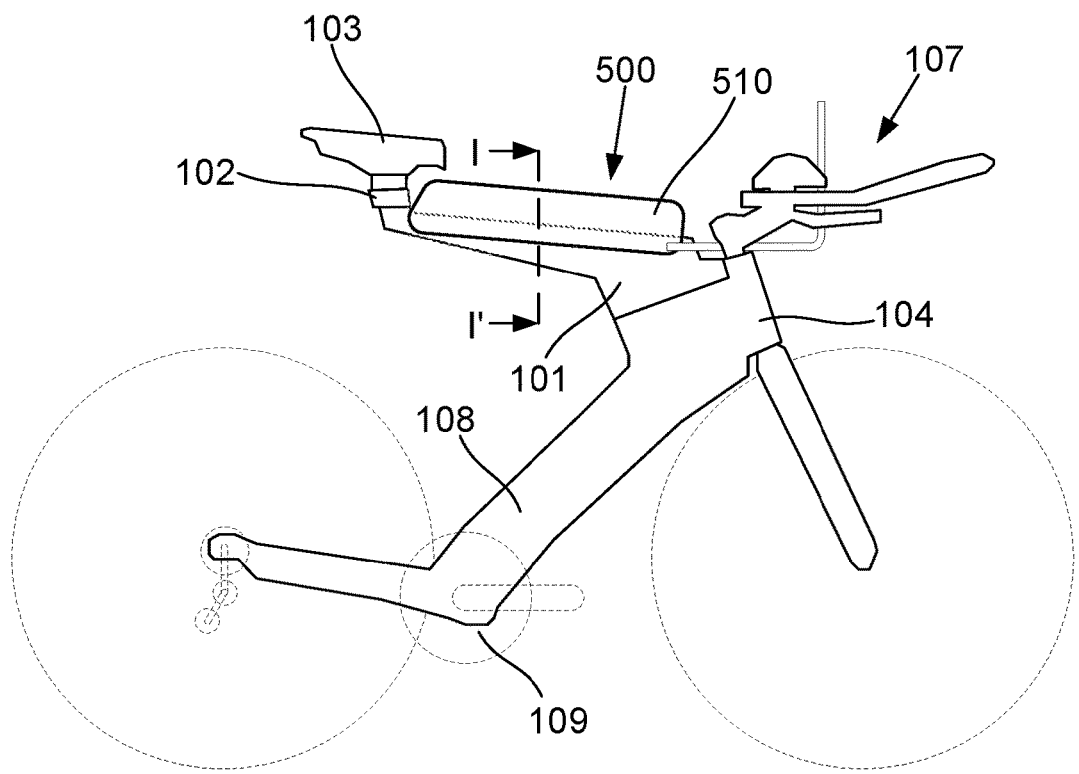
FIG. 5A is a schematic side view of a fourth example of a fluid reservoir mounted to the cycle frame of FIG. 1.
Figure 5B:
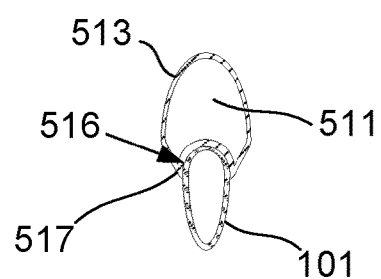
FIG. 5B is a schematic cross sectional view along the line I-I' of FIG. 5A.

A fourth example of a fluid reservoir will now be described with reference to FIGS. 5A and 5B.

In this example, the fluid reservoir 500 includes a generally rectangular elongate body 510 defining a fluid cavity 511, and a single recess 516 extending along an underside edge surface 517. The recess 516 receives an upper surface of the top tube 101, so that the fluid reservoir is supported on top of the top tube 101, extending substantially along the length of the top tube 101. Again, in this example, the upper and lower surfaces 513, 517 of the body are shaped to define a teardrop shape, with the lower surface 517 generally conforming to the underside surface of the top tube 101.

Figure 6A:
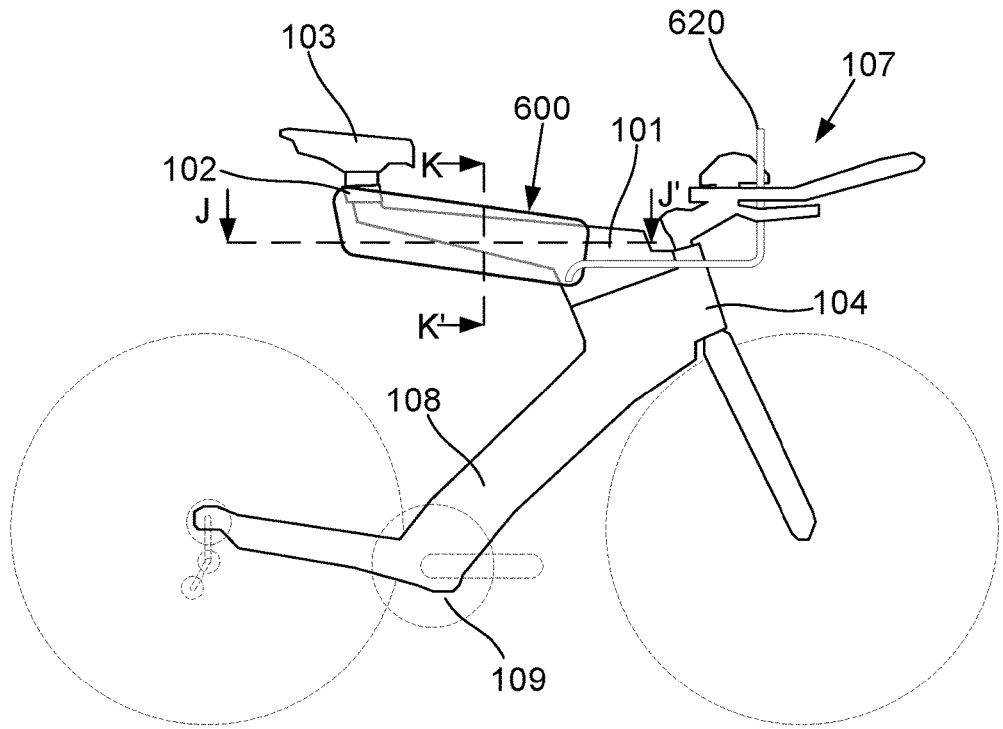
FIG. 6A is a schematic side view of a fifth example of a fluid reservoir mounted to the cycle frame of FIG. 1.
Figure 6B:
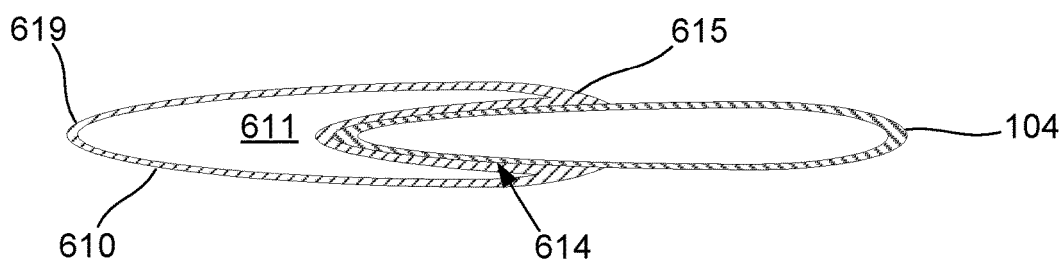
FIG. 6B is a schematic cross sectional view along the line J-J' of FIG. 6A.
Figure 6C:
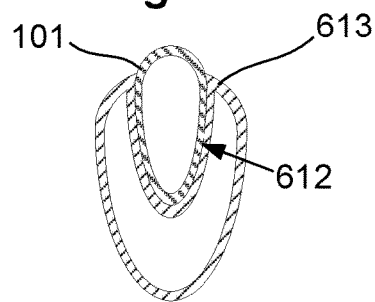
FIG. 6C is a schematic cross sectional view along the line K-K' of FIG. 6A.

A fifth example of a fluid reservoir will now be described with reference to FIGS. 6A to 6C.

In this example, the fluid reservoir 600 includes a generally rectangular elongate body 610 defining a fluid cavity 611, and a single recess 612 extending downwardly from an upper surface 613 and inwardly from the leading edge surface 615, allowing the fluid reservoir 600 to extend along either side of the top tube 101. Again, the upper edge 612 surface of the body to conform to the shape of the top tube 101, whilst tapering towards the lower and trailing edges 517, 519.

Figure 7A:
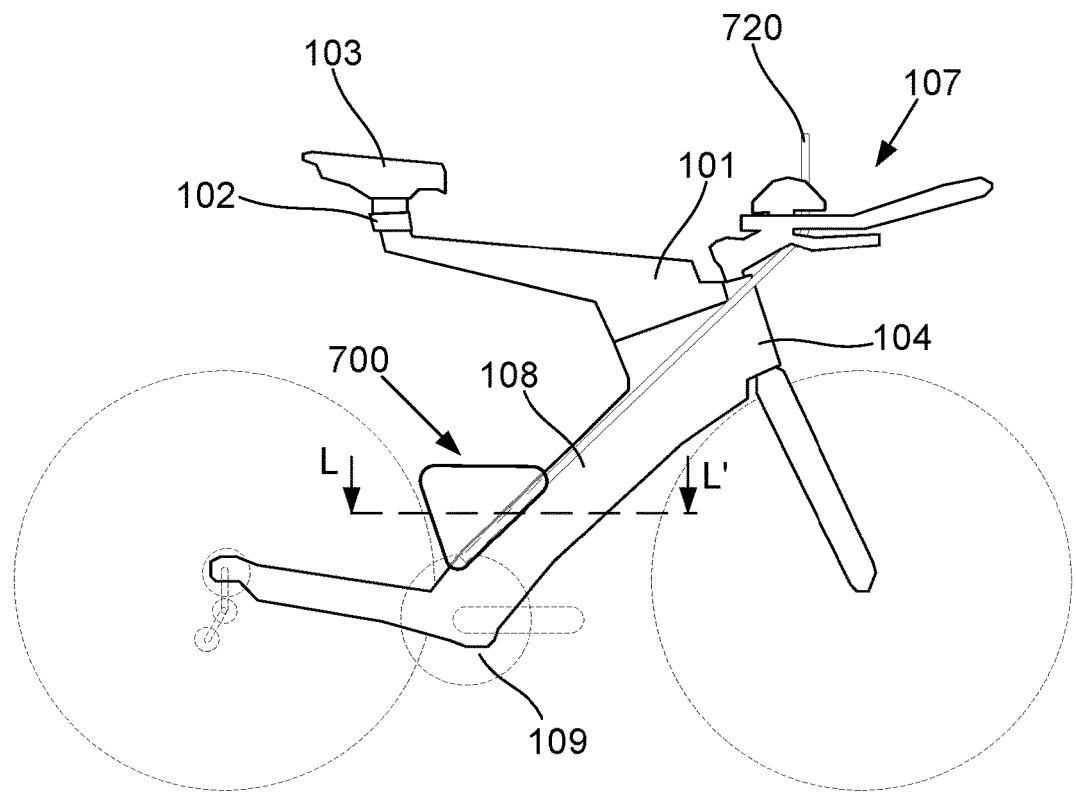
FIG. 7A is a schematic side view of a sixth example of a fluid reservoir mounted to the cycle frame of FIG. 1.
Figure 7B:
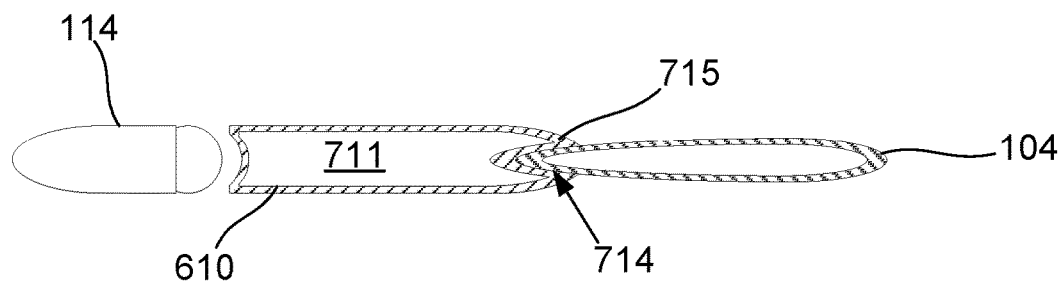
FIG. 7B is a schematic cross sectional view along the line L-L' of FIG. 7A.

A sixth example of a fluid reservoir will now be described with reference to FIGS. 7A to 7C.

In this example, the fluid reservoir 700 includes a generally triangular body 710 defining a fluid cavity 711. A single recess 716 is provided along a leading underside surface 717 for receiving an upper trailing surface of the down tube 108, whilst the tip of the triangular shape abuts against the bottom bracket 109. The leading underside surface 717 is shaped to conform to the down tube 108, to thereby provide an aerodynamic leading edge.

However, in this example, a trailing edge 719 of the body 710 is widened to correspond to a width of the rear wheel 114, so that airflow is directed around the down tube 108, and then around the body 710 and wheel 114. This avoids airflow having to pass round first the down tube 108 and then separately around the wheel 114, leading to the most drag efficient design as it reduces significantly reduces the drag induced by the rear wheel 114. However, in this example fluid needs to be drawn up a significant height to the rider, which can make draining all of the fluid from the reservoir difficult depending on the circumstances of use.

Figure 8:
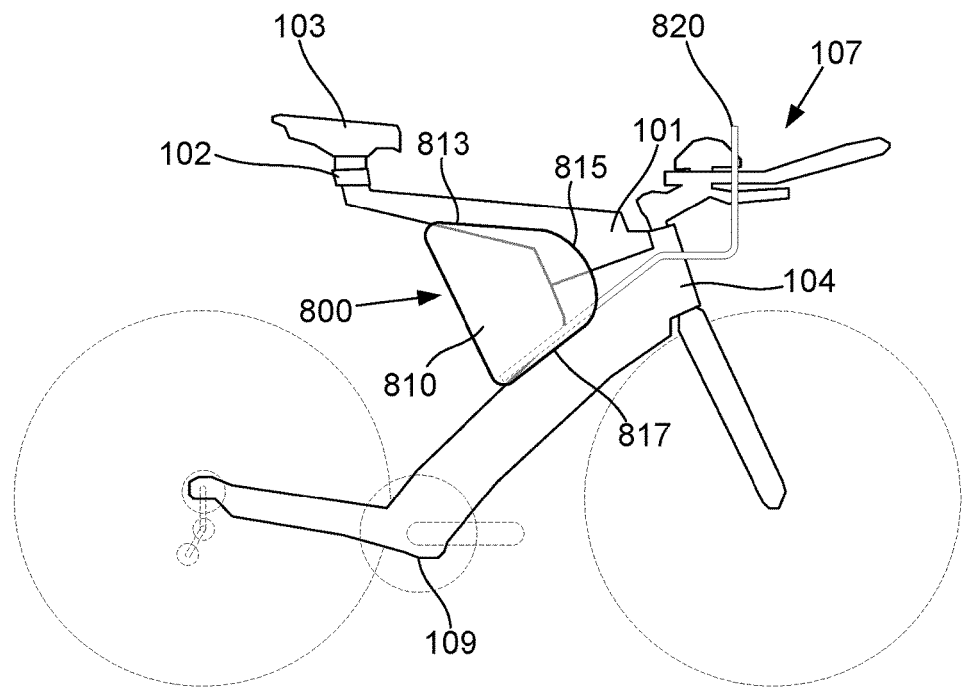
FIG. 8 is a schematic side view of a seventh example of a fluid reservoir mounted to the cycle frame of FIG. 1.

A seventh example of a fluid reservoir will now be described with reference to FIG. 8.

Figure 3A:
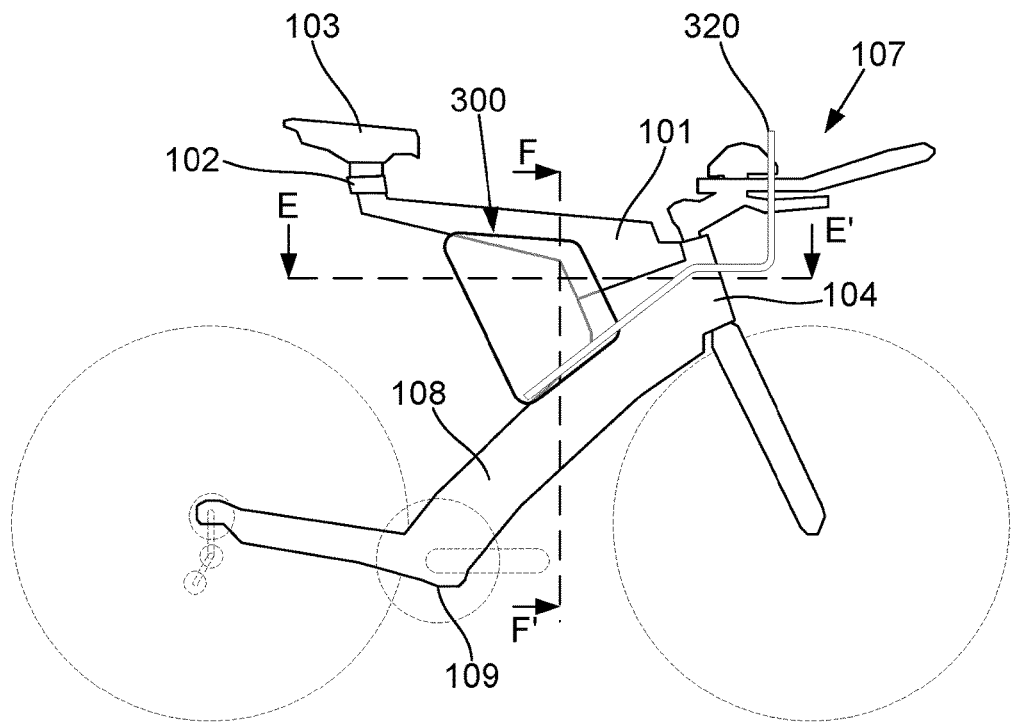
FIG. 3A is a schematic side view of a second example of a fluid reservoir mounted to the cycle frame of FIG. 1.
Figure 3B:
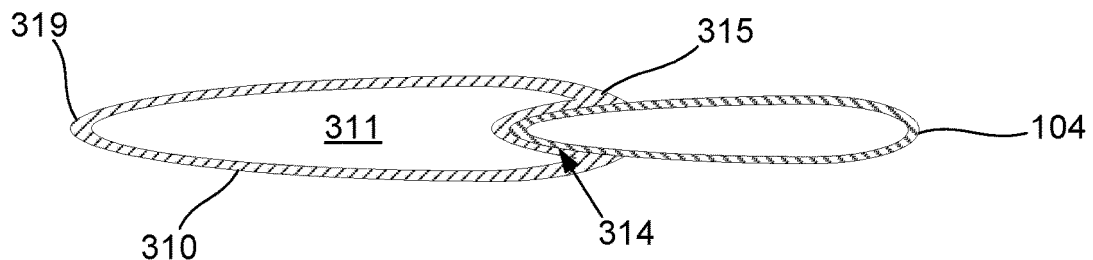
FIG. 3B is a schematic cross sectional view through the line E-E' of FIG. 3A.
Figure 3C:
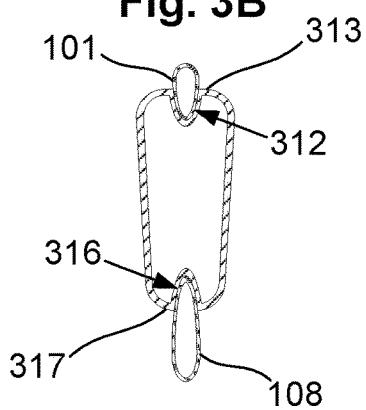
FIG. 3C is a schematic cross sectional view through the line F-F' of FIG. 3A.

In this example, the fluid reservoir 800 includes a generally triangular body 810 defining a fluid cavity, which is similar to the arrangement of FIGS. 3A to 3C. In this example however, the leading edge 815, as well as flaring outwardly from the frame, is also curved into the upper and lower edges 813, 817 for further aerodynamic efficiency. It will be appreciated that this could also be applied to other ones of the configurations and use of straight edges is not intended to be limiting.

Figure 9A:
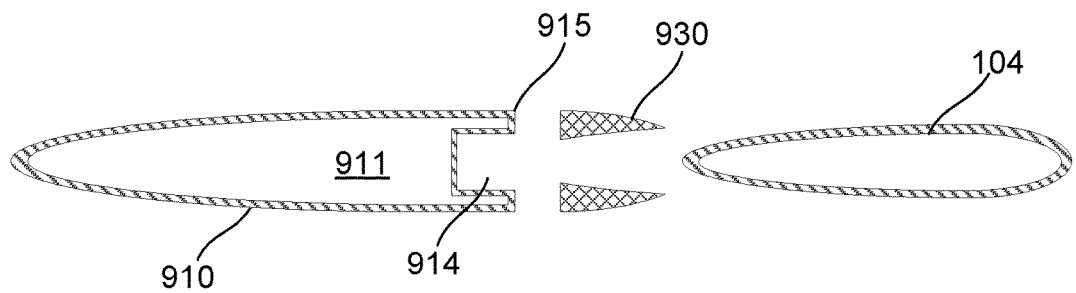
FIG. 9A is a schematic exploded cross sectional view of an eighth example of a fluid reservoir mounted to the cycle frame of FIG. 1.
Figure 9B:
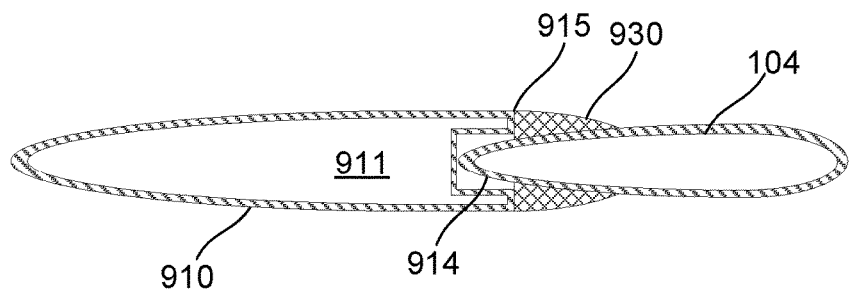
FIG. 9B is a schematic constructed view of the fluid reservoir of FIG. 9A.

An eighth example of a fluid reservoir will now be described with reference to FIGS. 9A and 9B.

In this example, the fluid reservoir 900 includes a body 910 defining a fluid cavity 911. As will become apparent from the following, the body 910 could be of a generally similar shape to that of any of the previous embodiments. However, in this example, the leading edge 915 of the body 910 is not flared, but is instead flattened with an enlarged recess 914. This arrangement can still be used to accommodate part of the frame, such as the headset 104, in a manner similar to that described above, but the leading edge 915 does not necessarily conform to the shape of the frame.

Instead, a separate shroud 930 is provided, that in use sits forwardly of the leading edge 915, so that the leading edge abuts against a back of the shroud 930. The shroud 930 has an outer surface that cooperates with the frame to define an aerodynamic profile, and in one example, includes an inner surface that confirms to the frame, so as to allow the shroud to be positioned securely against the frame.

In use, this arrangement allows the fluid reservoir 900 to be formed from a body 910 that is not necessarily custom designed for a specific frame. Instead, the body 910 is adapted to be used with a wider variety of frames, with a respective shroud being provided for each different frame so as to define an aerodynamic overall profile. As the shroud can be manufactured more easily than the body, this increases the ease with which the reservoir can be adapted for use with different styles of frame. In any event, it will be appreciated that in this example, the reservoir is formed from a body and shroud, which in conjunction perform a similar function to that of the body in the examples of FIGS. 2 to 8. It will also be appreciated from this that the recess within the body could be wholly replaced by a recess defined by a shroud, although generally this would not be preferred as the recess in the body ensures at least some degree of physical interaction between the frame and body, thereby assisting in holding the body in the required position.

In any event, it will be appreciated that a wide range of different designs can be encompassed within the general principle of providing a fluid reservoir that includes a recess for receiving part of the cycle frame, and which is shaped so as to cooperate with the frame to provide an aerodynamically effective surface that lowers drag. This may simply maintain the drag of the frame as compared to the frame without an attached fluid reservoir, meaning this is significantly more aerodynamically efficient than using a standard water bottle, or can even enhance the aerodynamic efficiency, resulting in a lower drag than the native frame without a reservoir fitted.

Whilst the above examples have focussed on the use of a "V"-shaped frame, this is not essential and many of the features can be implemented on more traditional triangular frames, such as UCI (Union Cycliste Internationale) compliant frames. It will therefore be appreciated that explanation with respect to a "V"-shaped frame, whilst particularly advantageous is not intended to be limiting.

Whilst the above examples have focussed on providing a fluid reservoir including at least one recess adapted to receive a part of the frame, in other arrangements a portion of the frame may be recessed so as to receive a fluid reservoir in use.

An example of a cycle frame including a reservoir recess will now be described in more detail with reference to FIGS. 10A to 10E.

In this example, the frame 1000 includes a top portion 1010 (hereinafter referred to as the "top tube") extending from a head end 1011 to seat mounting 1012, a connecting portion (or down tube) 1020 extending from the seat mounting 1012 to a bottom bracket mounting 1031 and a wheel mounting portion (or chain stay) 1030 extending from the bottom bracket mounting 1031 to a wheel mounting end 1032.

A number of different components can be attached to the frame 1000 to form a functioning bicycle and examples of these will now be described.

The head end 1011 typically includes a head tube opening, in which is provided a stem 1041, with a headset coupled to handle bars 1042 and one or more forks 1043 that support a front wheel 1044 in use, although any suitable arrangement can be used. The seat mounting 1012 is typically used to support a seat post 1045 coupled to a seat 1046, and an example of this arrangement will be described in more detail below.

In this example, the wheel mounting portion 1030 includes two stays 1034, 1035 that extend along either side of the rear wheel 1052, although single mono-stay arrangements could also be used. A wheel mounting 1050 is coupled to the wheel mounting end 1032 at the end of each stay 1034, 1035, which supports an axle of a rear wheel 1052 and which also has a gear cassette 1053 mounted thereon. A rear derailleur 1054 may also be coupled to the wheel mounting 1050.

Figure 10A:
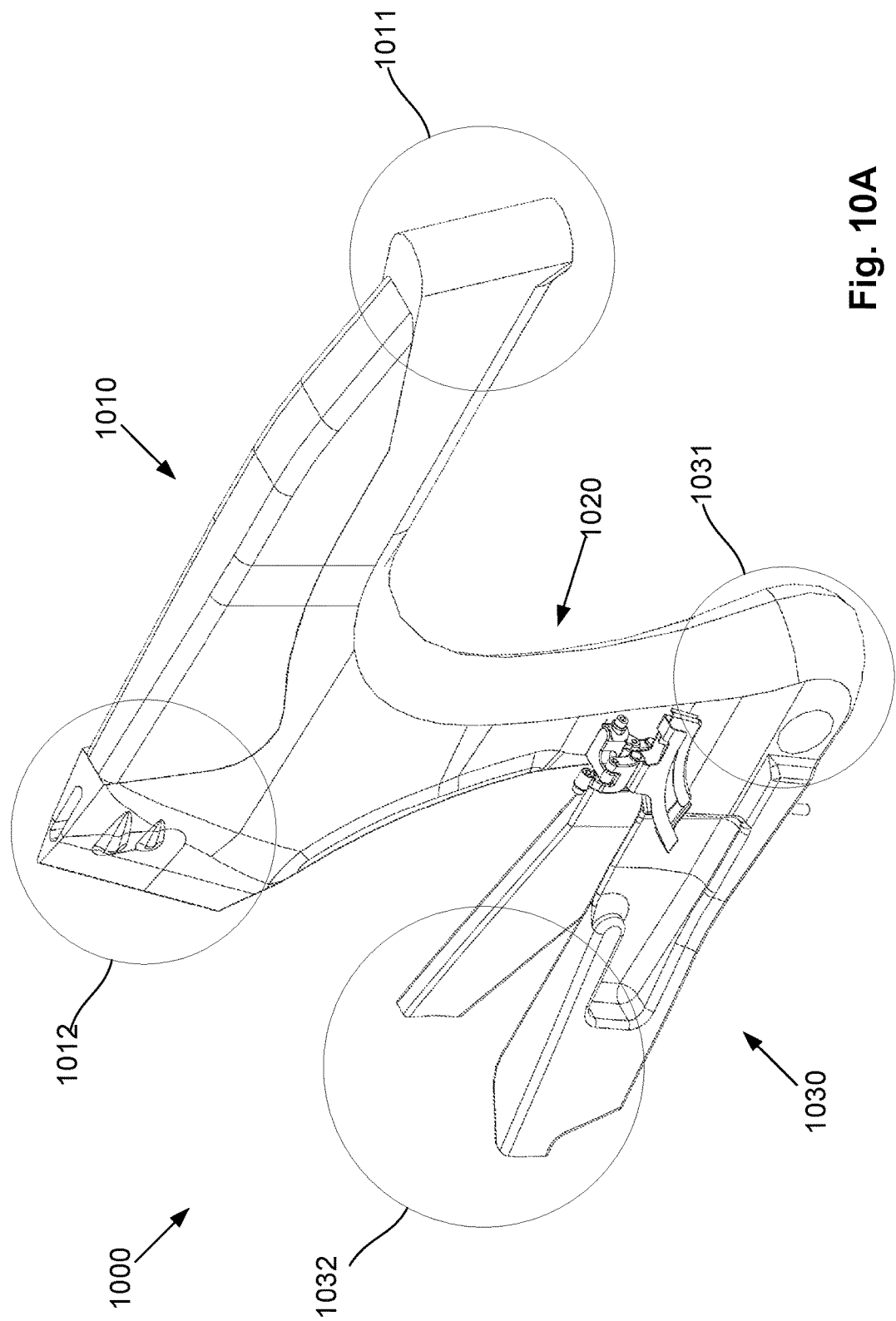
FIG. 10A is a schematic isometric view of another example of a cycle frame.
Figure 10B:
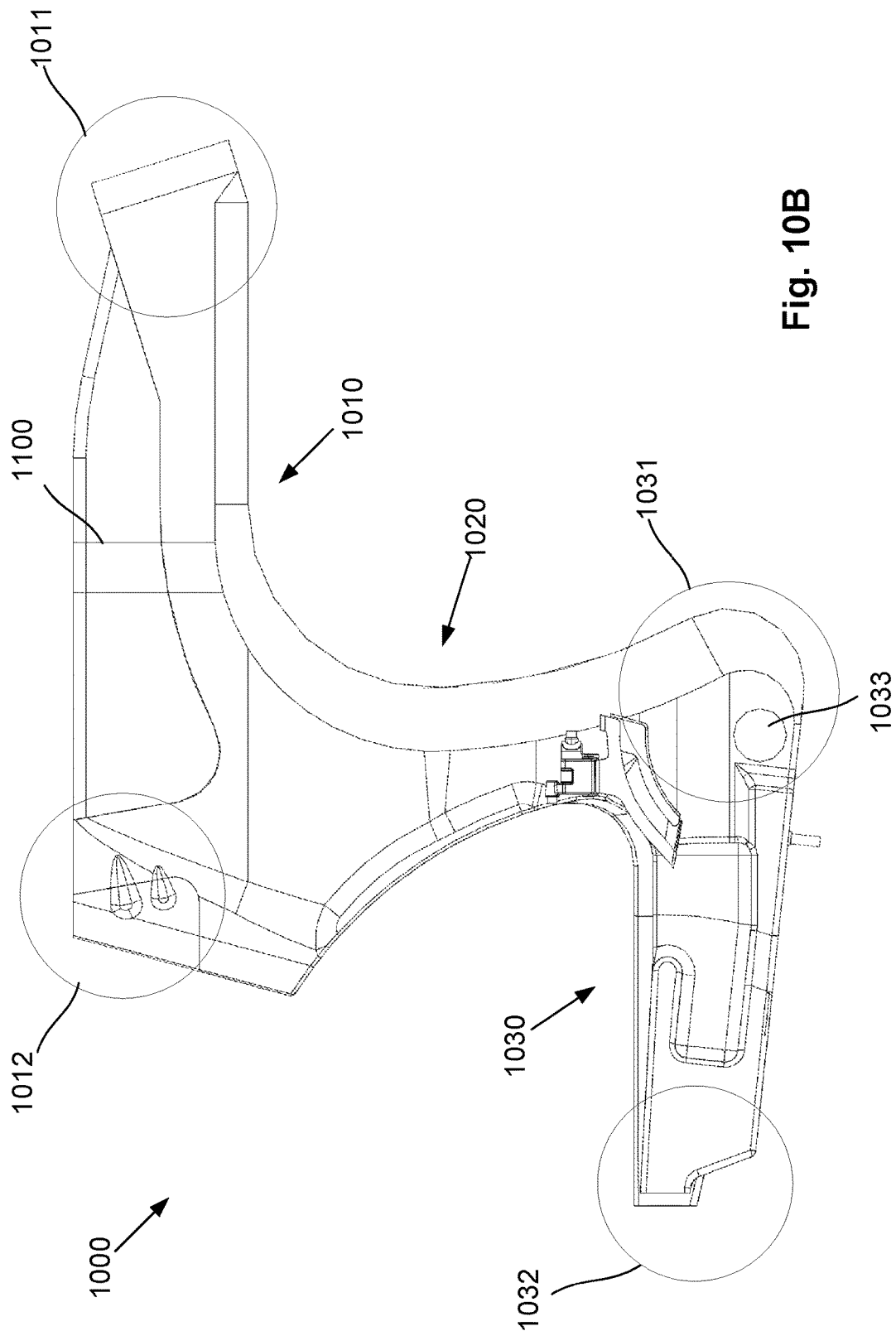
FIG. 10B is a schematic side view of the cycle frame of FIG. 10A.
Figure 10C:
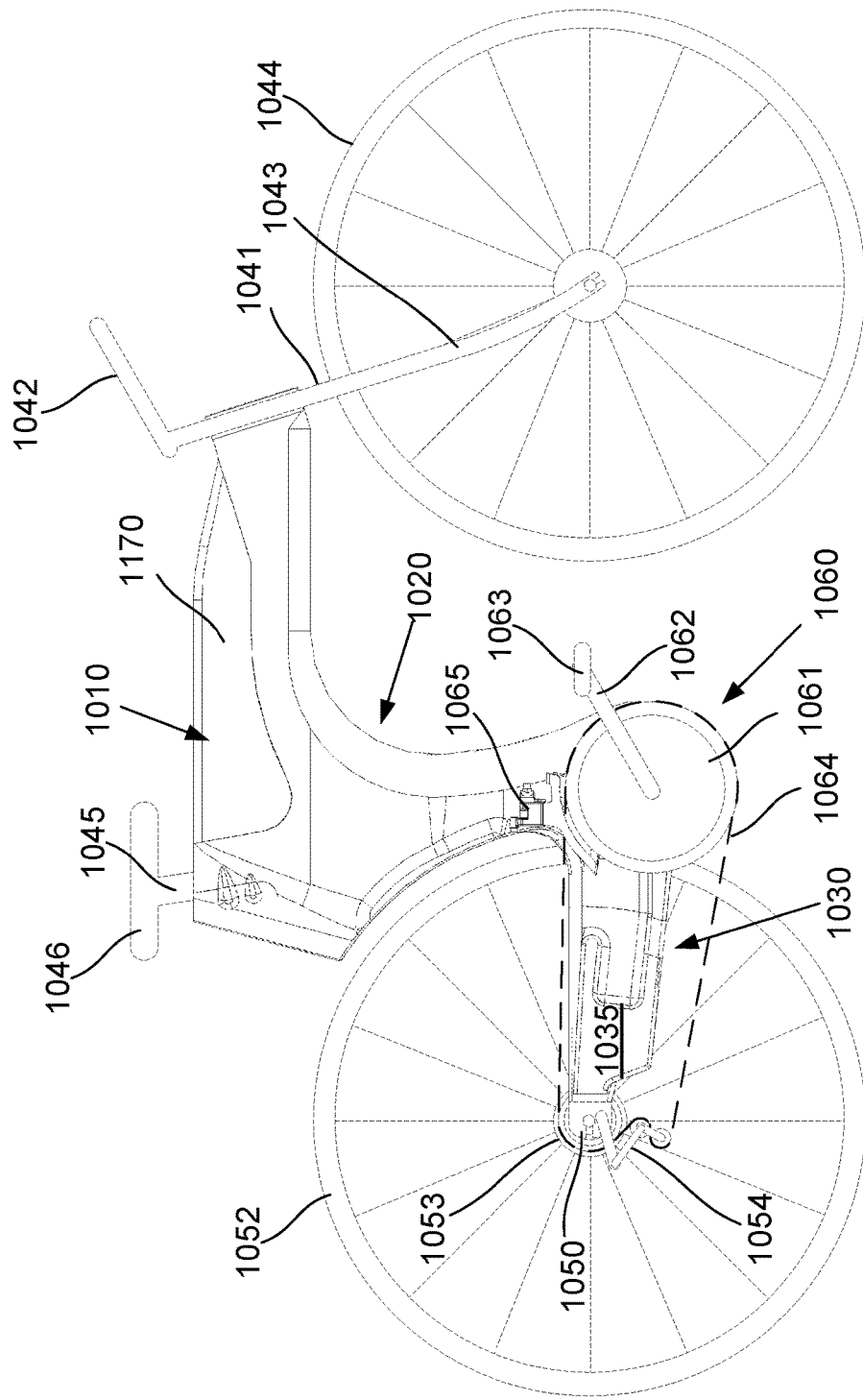
FIG. 10C is a schematic side view of a bicycle incorporating the cycle frame of FIG. 10A.
Figure 10D:
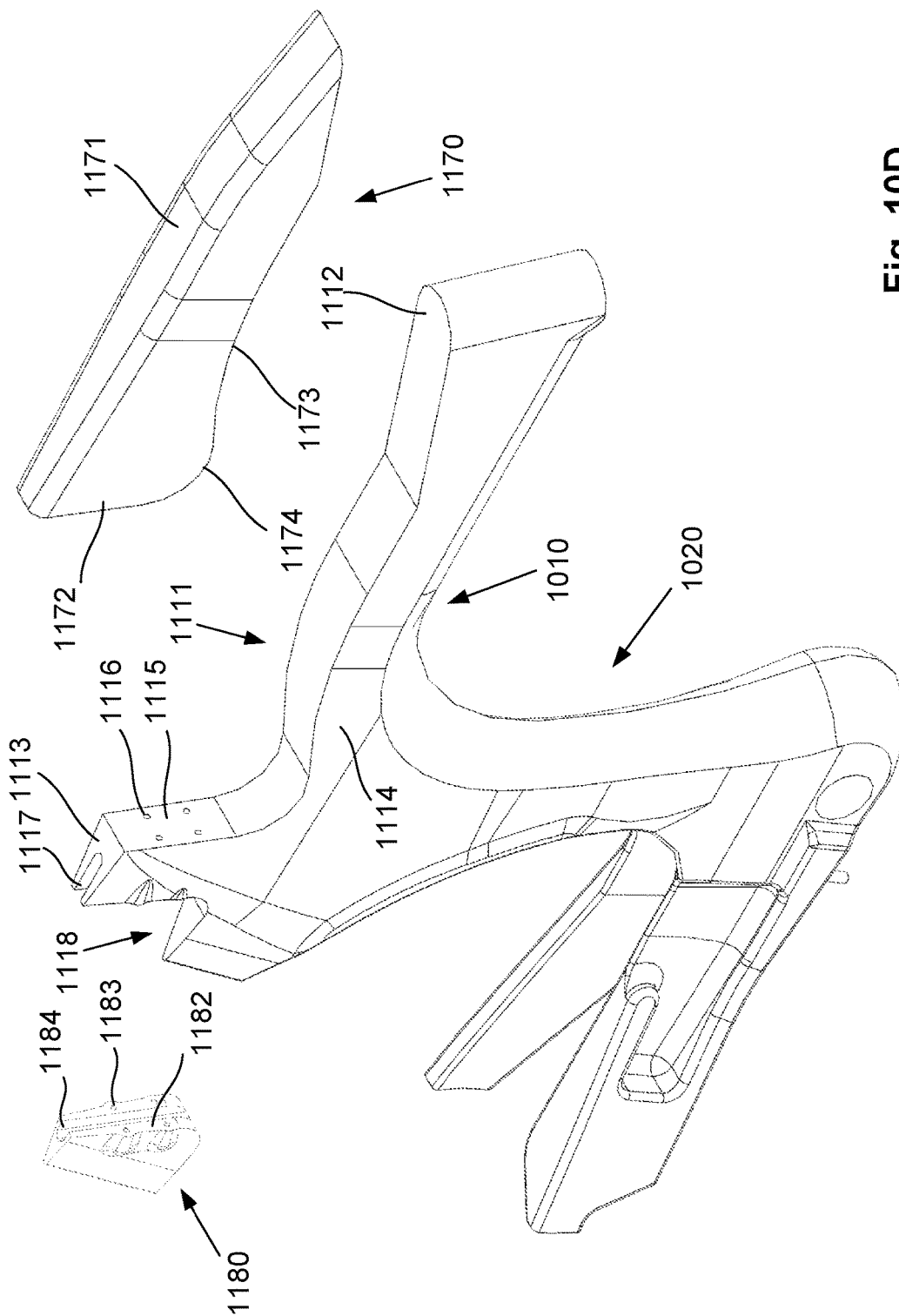
FIG. 10D is a schematic isometric view of the cycle frame of FIG. 10A in an exploded configuration.
Figure 10E:
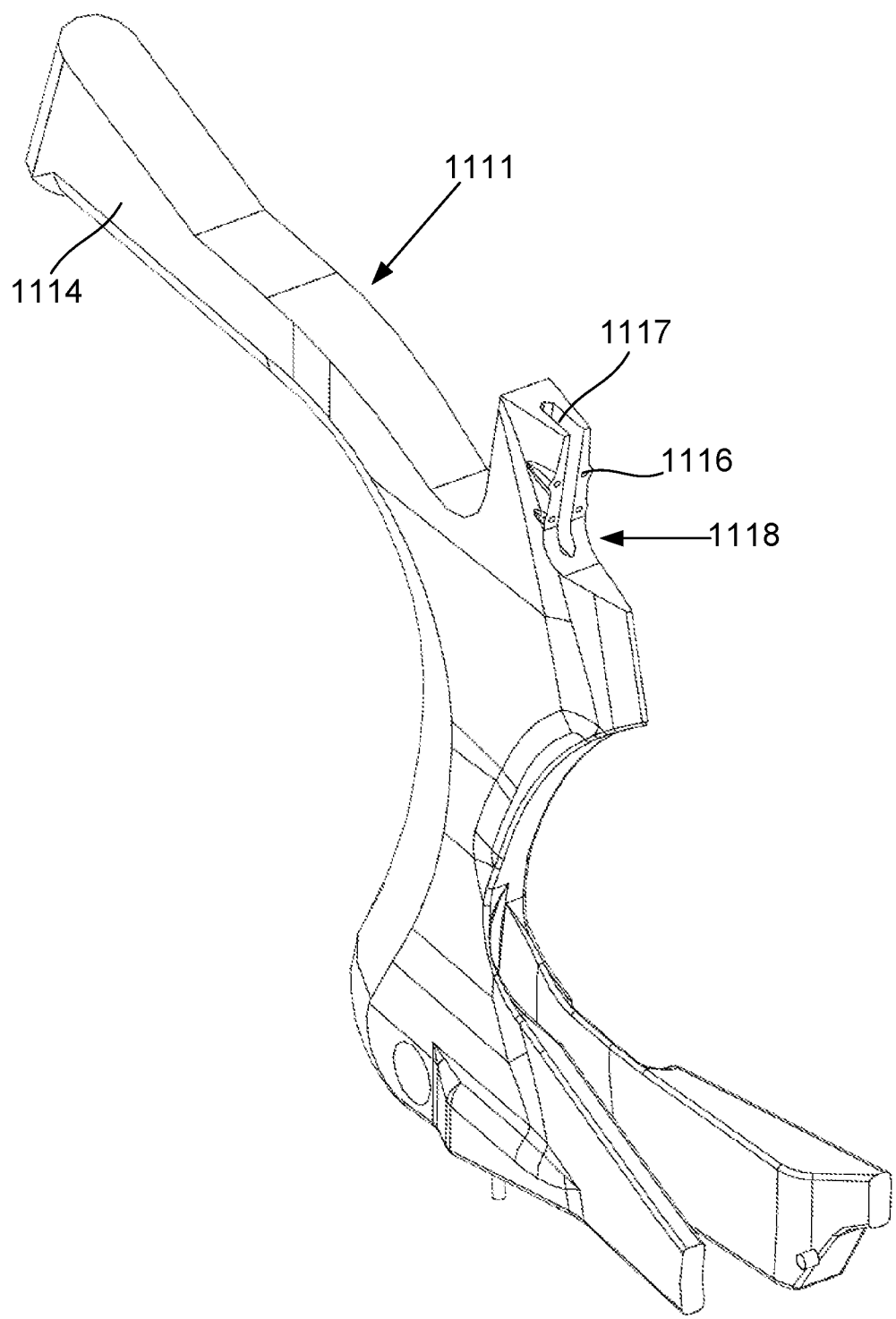
FIG. 10 E is a schematic rear isometric view of the cycle frame of FIG. 10A with the fluid reservoir and seat clamp omitted.

The bottom bracket mounting 1031 typically includes an opening 1033 extending laterally through the frame 1000 that receives a crank set 1060 including chain rings 1061, a crank 1062 and pedals 1063, that in use drive a chain 1064. A front derailleur 1065 can also be provided allowing the chain to be selectively moved between different chain rings 1061. In the example of FIG. 10C, the front derailleur 1065 is coupled to the connecting portion 1020 of the frame 1000, in accordance with standard mounting configurations, although alternative arrangements can be used.

In this example, the top tube 1010 and wheel mounting portion 1030 extend in substantially parallel directions and are aligned generally horizontal, when the bicycle is supported on a horizontal surface. The connecting portion 1020 extends generally vertically between the top and wheel mounting portions 1010, 1030 to define a substantially "Z" shaped frame 1000.

The frame 1000 is typically a carbon fibre shell containing a foam, such as extruded polystyrene, or polyurethane foam, which is typically of sufficient strength to add structural strength to the carbon fibre shell. Whilst in some embodiments foam may be injected into the shell, this is not essential and the addition of foam will be dependent upon the manufacturing technique used. The frame 1000 is generally formed as a monocoque frame, with the top tube 1010, connecting portion 1020 and wheel mounting portion 1030 being integrally formed.

In this example, the top tube 1010 includes a reservoir recess 1111, and wherein a fluid reservoir 1170 is removably mounted within the reservoir recess 1111 in use. The fluid reservoir 1170 is shaped so that the fluid reservoir 1170 and top tube 1010 cooperate to define an aerodynamic profile. It is to be understood that the term 'within' used in the above context should be taken to mean that the fluid reservoir is mounted within an extent of an aerodynamic profile of the frame and not necessarily internally inside of any tubular portion of the frame.

In particular, the fluid reservoir 1170 is shaped to conform with parts of the top tube 1010 beyond the extent of the reservoir recess 1111. For example, the fluid reservoir 1170 can include an upper surface 1171, which aligns with an upper surface 1112 of the top tube 110, forwardly of the fluid reservoir 1170, and which also aligns with an upper surface 1113 of the seat mounting 1012, rearwardly of the fluid reservoir 1170. Similarly, side walls 1172 of the fluid reservoir 1170 align with side walls 1114 of the top tube 1010. This arrangement avoids discontinuities and obstacles, which can impede air flow, in turn ensuring air flows smoothly round the top tube 1010 and reservoir 1170, which can assist in significantly reducing aerodynamic drag.

Accordingly, in this example the shape of the reservoir 1170 is adapted to be integrated into the overall shape of the frame 1000 to thereby contribute to the aerodynamic effectiveness of the frame 1000. This is in contrast to traditional arrangements in which fluid reservoirs, such as water bottles, are generally affixed externally to the frame and do not form part of the aerodynamic profile of the frame 1000.

A number of further features of the reservoir arrangement will now be described.

In one example, the reservoir 1170 is provided in an upper surface of the top tube 1010, so that the upper surface 1171 of the reservoir 1170 forms at least part of an upper surface of the top tube 1010. This facilitates fitting and removal of the fluid reservoir 1170, allowing this to be easily removed for refilling. Additionally, in some examples the fluid reservoir 1170 is at least partially transparent, for example by manufacturing this from a suitable material or forming a transparent window, which allows a rider to easily observe fluid levels in the fluid reservoir 1170, for example by glancing down from their riding position. Allowing the cyclist to visually observe fluid levels is advantageous, particularly in competition scenarios, in terms of allowing the rider to pace their water consumption over the duration of the event. It is however not essential that any part of the reservoir is transparent and in other examples it may not be. The bottle can be made of any suitable material and this could include any one or more of high-density polyethylene (HDPE), low-density polyethylene (LDPE), copolyester, polypropylene, or the like.

The fluid reservoir 1170 typically extends substantially along a length of the upper surface of the top tube 1010, thereby maximising the volume of fluid that can be contained, therein, although this is not essential. The fluid reservoir 1170 can also include two or more reservoir portions, for example formed by a dividing wall (not shown) running along an internal length of the fluid reservoir 1170, that contain respective fluids in use. This can be used to allow different fluids, such as water and an energy drink, to be provided and drunk by the rider as desired, for example via respective drinking tubes.

The fluid reservoir 170 typically includes a lower surface 1173 that generally conforms with a surface of the recess 1111. In one example, the lower surface 1173 extends downwardly to a sump 1174 so that fluid drains into the sump 1174. The fluid reservoir 1170 can then include a drinking tube (not shown) extending from the fluid reservoir, the drinking tube terminating within the sump 1174 thereby allowing fluid to be removed from within the sump 1174. In this arrangement, the sump 1174 forms the lowest part of the fluid reservoir 1170 so that fluid drains preferentially into the sump 1174, ensuring that substantially all of the fluid can be extracted from the reservoir using the drinking tube.

The lower surface 1173 of the fluid reservoir 1170 can also be shaped, for example, having a concave "V" profile running along the length of the fluid reservoir 1170, which cooperates with a corresponding convex "V" profile on the reservoir recess 1111, thereby assisting position and centre the fluid reservoir 1170 laterally with respect to the top tube 1010. Additionally and/or alternatively the fluid reservoir 1170 could be retained in position using other techniques, such as friction fit, interference fit or the like. A further alternative is the use of cooperating magnets in the fluid reservoir 1170 and the frame 1000 to retain the fluid reservoir 1170 in position.

The reservoir recess 1111 typically includes a seat mounting face 1115 including apertures 1116 extending through the seat mounting 1012 that receive seat mounting bolts (not shown). The seat mounting bolts threadingly engage a removable seat clamp 1180 to thereby clamp the seat post 1045 within the seat mounting 1012.

In this example, the seat mounting clamp 1180 includes a tapered body 1181, having a clamping face 1182, which in use is mounted in a correspondingly shaped recess 1118 of the seat mounting 1012, with the clamping face 1182 facing the seat mounting 1012. The clamping face 1182 includes threaded apertures 1183 that receive the bolts and a channel 1184, which cooperates with a complimentary channel 1117 in the seat mounting 1012 to define a generally rectangular tube, having chamfered corners, for receiving the seat post 1045. In use, the seat mounting bolts can be tightened to draw the seat clamp 1180 towards the seat mounting 1012 thereby clamping the seat post 1045 at a desired position within the tube.

This arrangement provides a number of advantages. For example, in this configuration, the seat mounting clamp 1180 includes internal threads needed to engage the bolts, whereas in traditional seat clamping arrangements these are mounted within the frame. In this example, in the event that the threads become stripped, the seat mounting clamp 1180 can be replaced, without necessitating replacement of the entire frame or a structure internal to the frame, which is typically expensive and/or complex to perform. Additionally, the use of the rectangular seat post 1045 and tapered seat mounting clamp 1180 helps improve the aerodynamic efficiency compared to traditional circular seat post and mounting arrangements.

In an alternative arrangement, the seat mounting may include an opening to receive the seat tube and a wedge clamp used to restrain the seat tube in the seat mounting. The wedge clamp includes at least one surface shaped to conform with an outer surface portion of the seat tube when tightened. The wedge clamp typically includes a pair of tapered clamp elements held together by a threaded fastener that extends into a blind threaded insert. Tightening the fastener causes the tapered surfaces of the wedge elements to slide relative to each other which thereby exerts a lateral clamping force onto the seat tube which clamps the seat tube securely within the seat mounting.

Testing has shown that the above described bike frame can be used to produce a bike having a significantly reduced drag compared to more traditional arrangements of bike frame, over a range of incident airflow angles, of at least ±20° compared to the direction of travel, which can in turn correspond to an increase in speed during a race. Alternatively, the reduction in drag may enable a rider to cycle at a given speed with less effort which can reduce fatigue and lead to better run performance off the bike in a triathlon for example.

The fluid reservoir may additionally include features which allow the reservoir to be refilled on the fly such as during a cycle or triathlon race. In such an event, an athlete may pass a hydration station where it is possible to grab a bottle of fluid to replace or top up a used bottle. To refill a conventional water bottle, typically a lid needs to be unscrewed or flipped open to provide internal access to the bottle. This can be a difficult operation whilst riding a bike and in some cases, an athlete may choose to stop at the hydration station in order to refill bottles.

Figure 11:
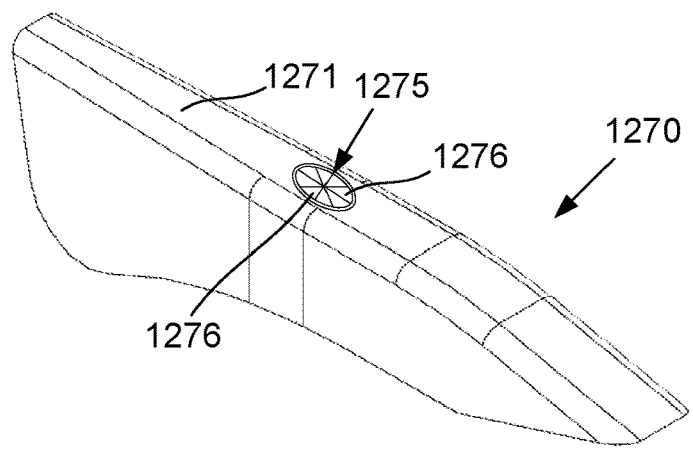
FIG. 11 is a schematic perspective view of an example of a fluid reservoir having a refill port.

In an example, the fluid reservoir may include a refill port enabling a rider to easily refill the reservoir whilst riding, i.e. "on the fly". Examples of filling port arrangements are provided in FIGS. 11 to 13. In FIG. 11, there is shown a fluid reservoir 1270 including a refill port 1275. The refill port 1275 is disposed through an upper surface 1271 of the reservoir 1270 which provides a convenient position for a rider to access whilst maintaining a substantially aerodynamic posture.

Typically, the refill port 1275 is covered by a plurality of flexibly resilient leaves 1276 which, in use, deflect out of the way to allow fluid to enter the refill port 1275. For example, an end of a bottle may be inserted into the refill port 1275 by deflecting the leaves 1276 generally downward which exposes an opening to the reservoir 1272. In this respect, the leaves 1276 typically hinge about a periphery of the port 1275. After refilling, the leaves 1276 return to a position which closes the port 1275 thereby substantially preventing splash back or spillage. In one example, the leaves 1275 may be rubber flaps.

Figure 12:
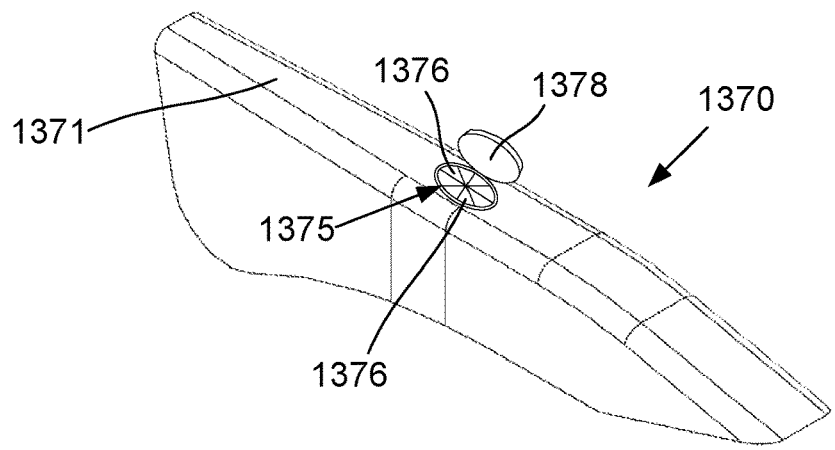
FIG. 12 is a schematic perspective view of a further example of a fluid reservoir having a refill port.

In the example shown in FIG. 12, there is provided a fluid reservoir 1370 including a refill port 1375 disposed through an upper surface 1371 of the reservoir 1370 and covered by a plurality of flexibly resilient leaves 1376 as previously described. In this example, the refill port 1375 additionally includes a flip-top cap 1378 adapted to cover the refill port 1375 and flexible leaves 1376. The cap 1378 further reduces the likelihood of spillage or splash back which is particularly useful when filling the reservoir 1370 with a sticky sports drink for example.

Figure 13:
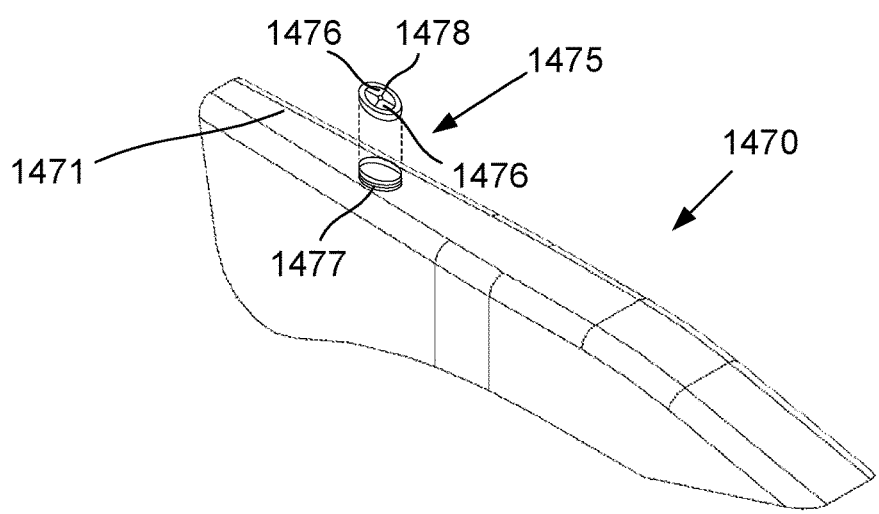
FIG. 13 is a schematic perspective view of another example of a fluid reservoir having a refill port.

A further example of a fluid reservoir 1470 having a refill port 1475 is provided in FIG. 13. In this example, the refill port 1475 includes a threaded inlet portion 1477 which is threadingly engaged by a cap 1478. In this example, the cap 1478 includes a plurality of flexibly resilient leaves 1476, which in use, cover the refill port 1475 and operate in the same manner as previously described.

In alternative arrangements, the flexibly resilient leaves may be substituted with a permeable membrane or gauze like material which allows fluid to enter the reservoir while minimising splash back and spillage.

Whilst the previously described examples have included a fluid reservoir provided in an upper surface of the top tube of the frame, other arrangements are possible in which the fluid reservoir forms part of the aerodynamic profile of the frame.

Figure 14A:
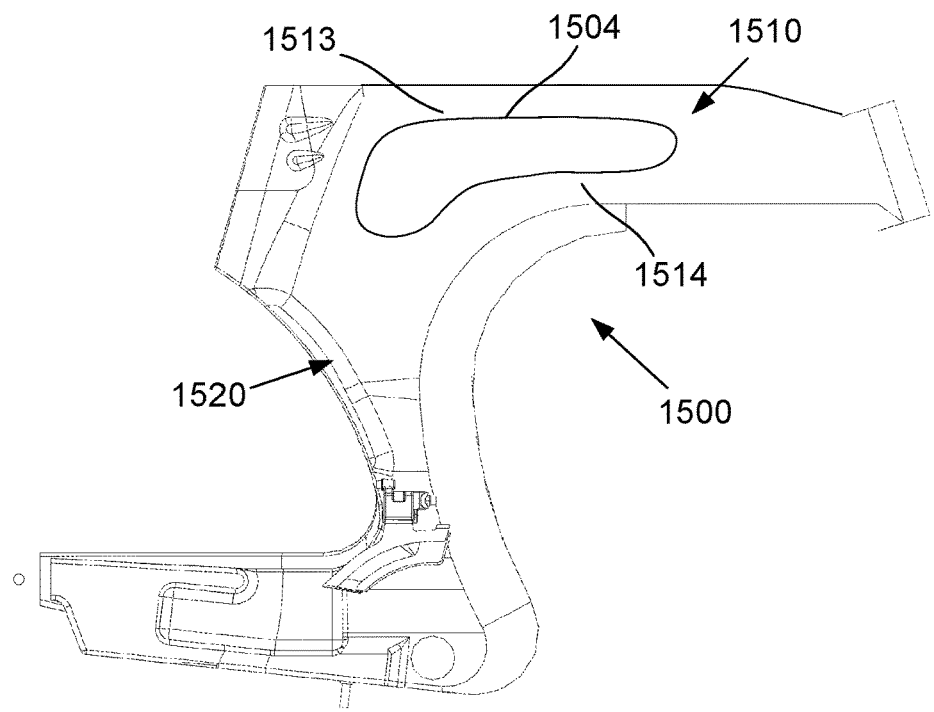
FIG. 14A is a schematic side view of a further example of a cycle frame having a through-opening in the top tube of the frame.
Figure 14B:
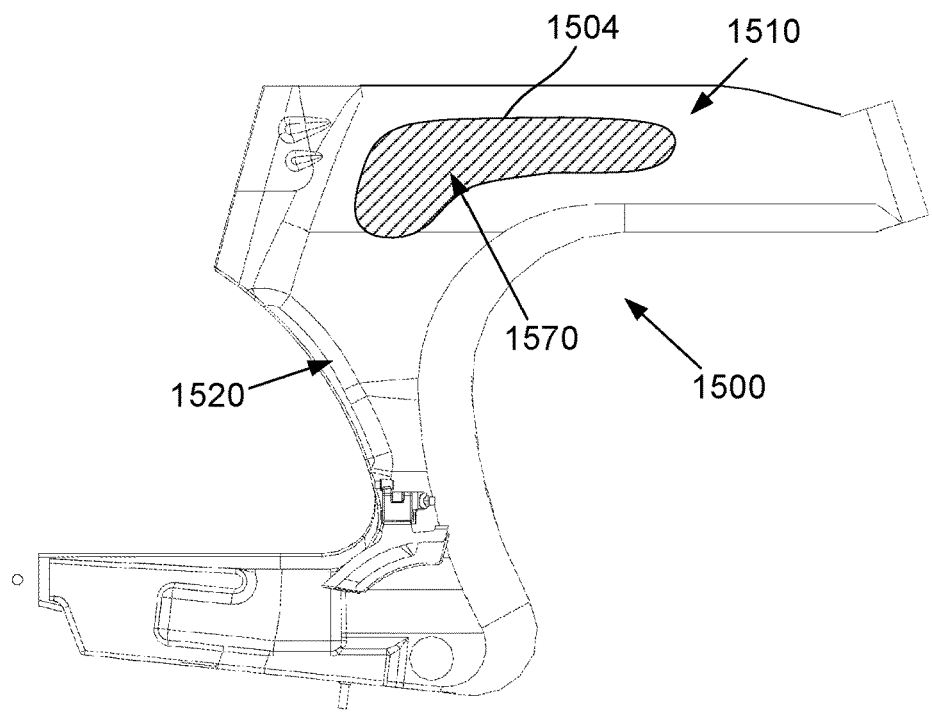
FIG. 14B is a schematic side view of the cycle frame of FIG. 14A showing an example of a fluid reservoir located within the through-opening of the top tube of the frame.

In another example, as shown in FIGS. 14A and 14B, a cycle frame 1500 includes a through-opening 1504 that is formed substantially through a top tube 1510 of the frame. The through-opening 1504 is substantially elongate and extends from a first side of the top tube to a second side of the top tube so as to form an aperture, window or slot.

In this arrangement, the through-opening 1504 divides the top tube 1510 into an upper section 1513 and a lower section 1514, respectively above and below the through-opening 1504. A fluid reservoir 1570 that is shaped to conform with the profile of the through-opening 1504 is mounted within the through-opening 1504 as shown in FIG. 14B so as to be within the aerodynamic profile of the frame. The reservoir 1570 may be fitted into the through-opening 1504 from either side of the frame 1500.

A potential advantage of the design shown in FIGS. 14A and 14B is that the top tube 1510 can be made lighter and stronger. The upper and lower sections 1513, 1514 of the top tube 1510 provide a higher section modulus compared to an enclosed tubular structure without the through-opening.

Figure 15A:
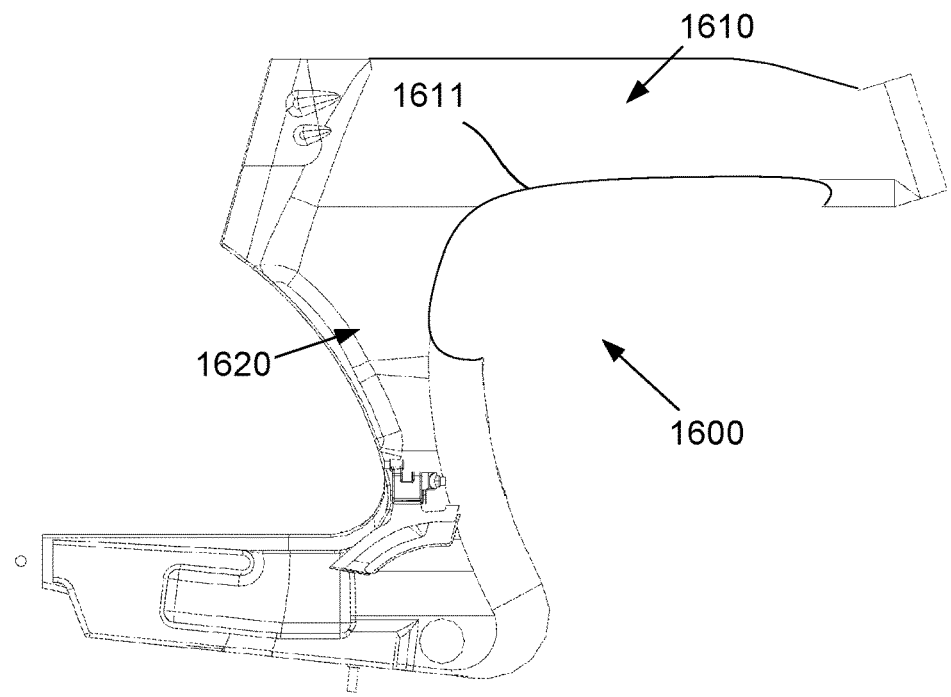
FIG. 15A is a schematic side view of a further example of a cycle frame having a recess underneath the top tube of the frame.
Figure 15B:
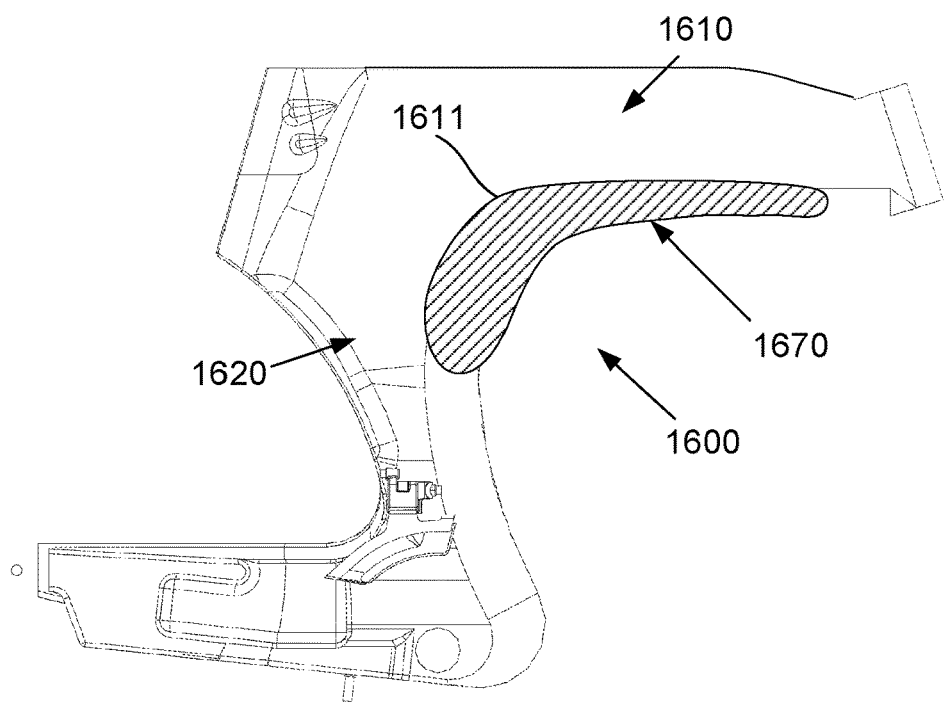
FIG. 15B is a schematic side view of the cycle frame of FIG. 15A showing an example of a fluid reservoir located in the recess underneath the top tube of the frame.

In a further example, a fluid reservoir 1670 is positioned underneath the top tube 1610 of a cycle frame 1600 as shown in FIGS. 15A and 15B. In this example, a lower surface of the top tube 1610 may include a reservoir recess 1611 and a fluid reservoir 1670 may be shaped to conform with the recess 1611 and be mounted therein. The profile of the reservoir recess 1611 and fluid reservoir 1670 may take several forms. In the example shown, the recess 1611 follows the contour of the frame 1600 along the top tube 1610 and partway down the connecting portion or seat tube 1620. In other arrangements, the recess 1611 may be substantially in the top tube 1610 only or alternatively may extend further down the connecting portion 1620.

In one example, the fluid reservoir 1670 may extend down the connecting portion 1620 so as to form the leading edge of the connecting portion or seat tube 1620 which splits air ahead of the rear wheel. In such an example, the fluid reservoir 1670 would form a critical aerodynamic portion of the connecting portion or seat tube 1620.

Figure 16A:
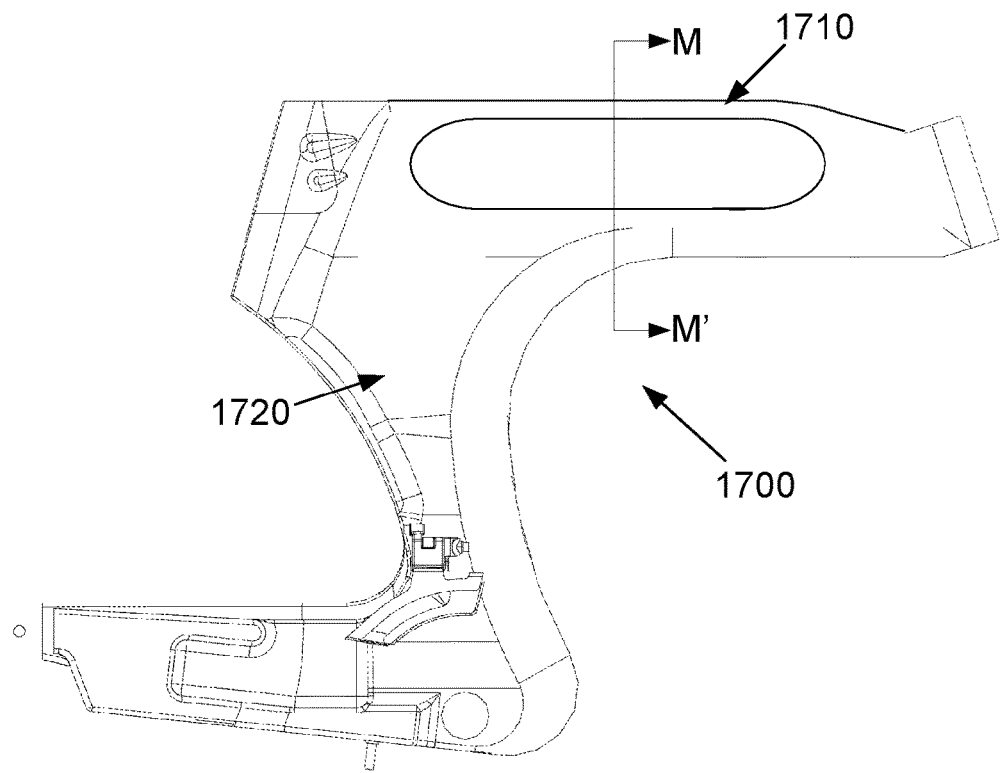
FIG. 16A is a schematic side view of a further example of a cycle frame having a recessed top tube including a longitudinally extending web.

Referring now to FIG. 16A, there is shown another example of a cycle frame 1700 including a top tube 1710 including a recessed section having a longitudinally extending web. The web may extend substantially centrally as shown in FIG. 16B, be offset as shown in FIG. 16D or form a side wall of the top tube as shown in FIG. 16F.

Figures 16B, 16C:
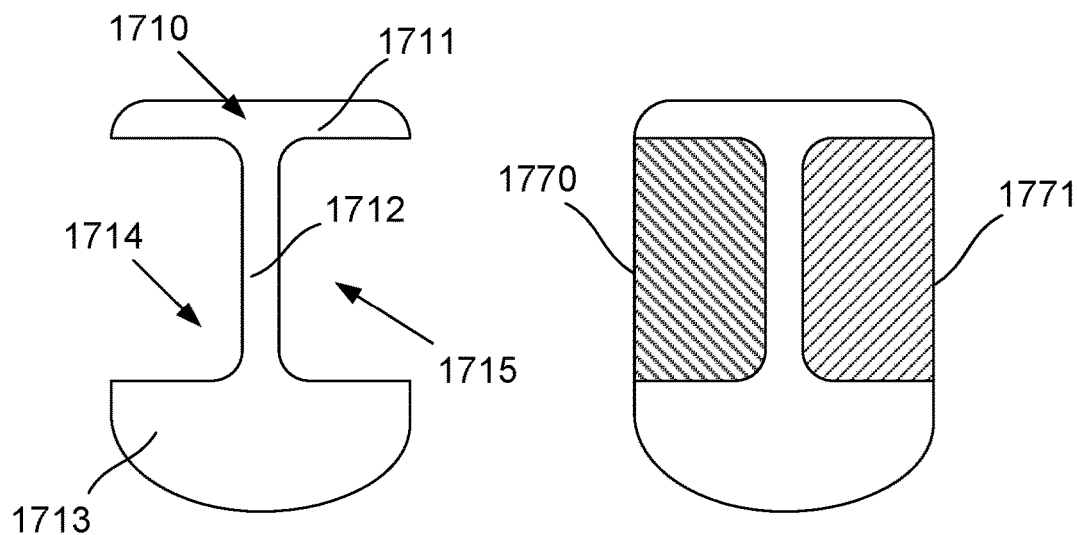
FIG. 16B is a first example of a sectional view along the line M-M' through the top tube of the cycle frame of FIG. 16A.
FIG. 16C is the same sectional view as shown in FIG. 16B with fluid reservoirs mounted in recessed portions of the top tube of the cycle frame.

In the example shown in FIG. 16B, the web 1712 is centrally extending so as to form two substantially symmetrical recesses 1714, 1715. Recesses 1714, 1715 may be used to mount fluid reservoirs 1770, 1771 as shown in FIG. 16C. Whilst typically reservoirs 1770, 1771 may both hold water, in other examples each reservoir may hold a different fluid. For example, one reservoir may hold water whilst the other one holds a sports drink. Similar to the design shown in FIG. 14A, the top tube 1710 comprising an upper segment 1711, lower segment 1713 and web 1712 (similar to an I-beam section) provides a structure with increased stiffness and strength and lower weight compared to an enclosed tubular structure.

Figures 16D, 16E:
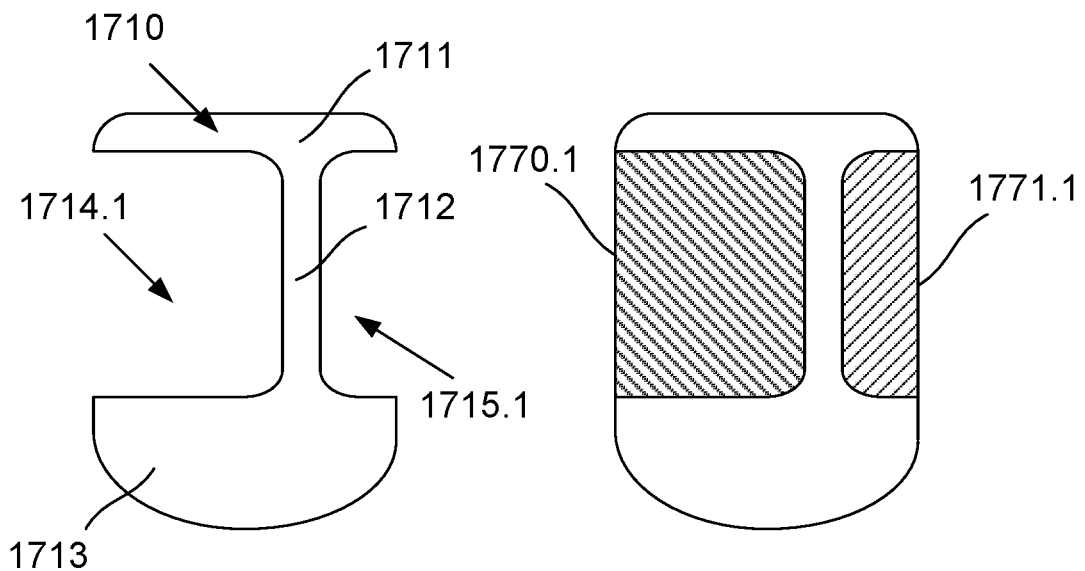
FIG. 16D is a second example of a sectional view along the line M-M' through the top tube of the cycle frame of FIG. 16A.
FIG. 16E is the same sectional view as shown in FIG. 16D with fluid reservoirs mounted in recessed portions of the top tube of the cycle frame.

In the example shown in FIGS. 16D and 16E, the web 1712 is offset relative to the centre of the top tube 1710 so that asymmetrical recesses 1714.1, 1715.1 are formed for locating fluid reservoirs 1770.1, 1771.1 of different shapes and volume.

Figures 16F, 16G:
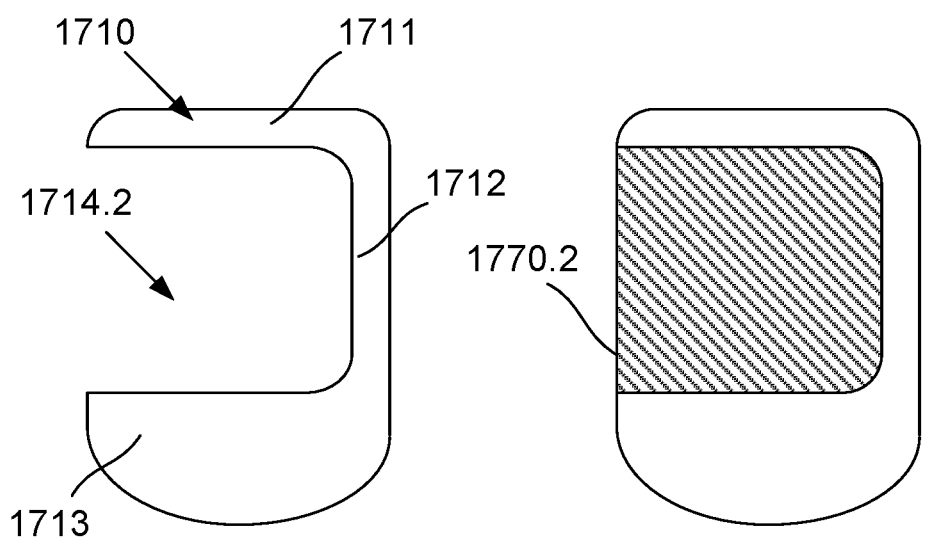
FIG. 16F is a third example of a sectional view along the line M-M' through the top tube of the cycle frame of FIG. 16A.
FIG. 16G is the same sectional view as shown in FIG. 16D with a fluid reservoir mounted in a recessed portion of the top tube of the cycle frame.

In a further example as shown in FIGS. 16F and 16G, the web 1712 forms part of a lateral side of the top tube 1710 which creates a single recess 1714.2 for locating a fluid reservoir 1770 that has a larger volume than the reservoirs provided in FIGS. 16C and 16E.

Figure 17A:
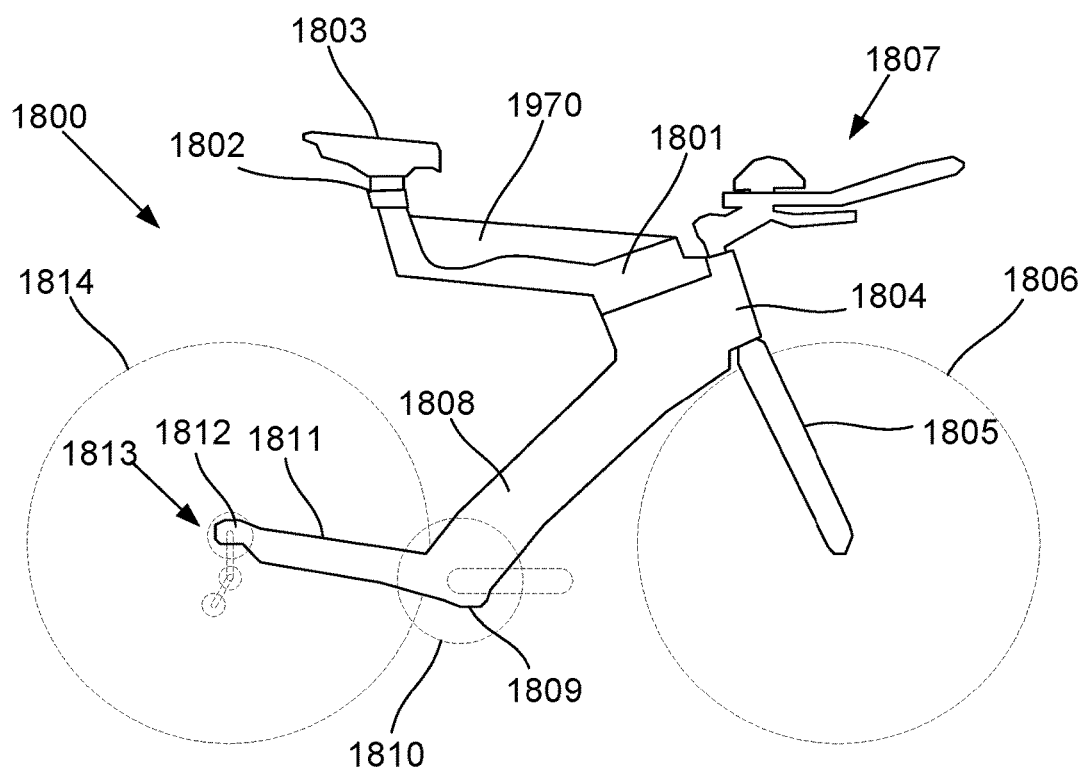
FIG. 17A is a schematic side view of another example of a cycle frame.
Figure 17B:
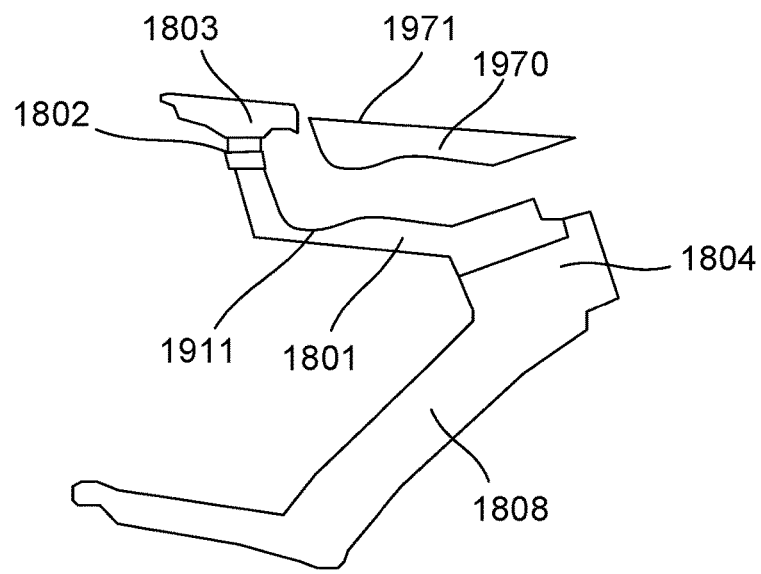
FIG. 17B is a partially exploded schematic side view of the cycle frame of FIG. 17A showing the fluid reservoir separated from the top tube.

Now referring to FIGS. 17A and 17B, there is shown a further example of a cycle frame 1800 having an integrated fluid reservoir 1970 removably mounted within the top tube 1801. In this example, the top tube 1801 of a V-frame cycle, such as manufactured by Dimond™, is modified so as to form a reservoir recess 1911. The fluid reservoir 1970 is shaped so that the fluid reservoir 1970 and top tube 1801 cooperate to define an aerodynamic profile. By providing the fluid reservoir in the top tube, a rider is able to easily access the reservoir during a race without needing to reach an excessive amount which may prove difficult in race situations with more conventional bottle arrangements.

In this example, the reservoir 1970 is provided in an upper surface of the top tube 1801, so that the upper surface 1971 of the reservoir 1970 forms at least part of an upper surface of the top tube 1801. In this example, the reservoir recess is shaped so as to accommodate the fluid reservoir having a sump located towards the seat mounting end of the top tube.

A fluid reservoir may be integrated into the top tube in many ways including for example as shown in FIGS. 18-23.

Figure 18:
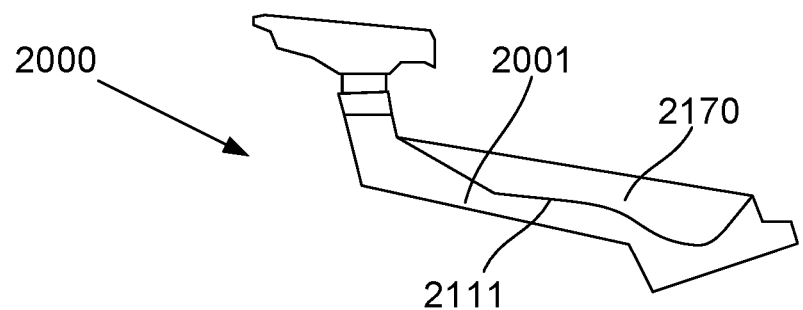
FIG. 18 is a partial schematic side view of another example of a cycle frame.

In FIG. 18, there is shown a cycle frame 2000 including a top tube 2001 having a reservoir recess 2111 located in an upper surface thereof, the recess shaped to accommodate a fluid reservoir 2170 having a sump located towards a head end of the frame.

Figure 19:
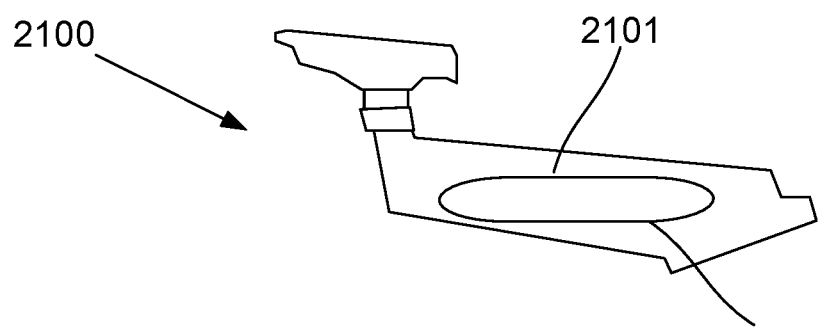
FIG. 19 is a partial schematic side view of another example of a cycle frame.

A further example of a cycle frame 2100 including a modified top tube is shown in FIG. 19. In this example, the frame 2100 includes a through-opening 2104 that is formed substantially through a top tube 2101 of the frame. The through-opening 2104 is substantially elongate and extends from a first lateral side of the top tube to a second lateral side of the top tube so as to form an aperture, window or slot similar to that described with respect to FIGS. 14 and 14B. In use, a fluid reservoir (not shown) is adapted to be mounted within the through-opening so as to be within the aerodynamic profile of the top tube of the frame. The reservoir may be fitted into the through-opening from either side of the frame.

In alternative arrangements, a longitudinally extending web may be formed in the opening so as to form one or more recessed sections in the top tube, similar to the arrangements described with respect to FIGS. 16A to 16G. In one example, a first reservoir recess is provided in a first lateral side surface of the top tube and a second reservoir recess is provided in a second lateral side surface of the top tube, wherein the first and second reservoir recesses are separated by a longitudinally extending web and first and second fluid reservoirs are removably mounted within the first and second reservoir recesses in use.

Figure 20:
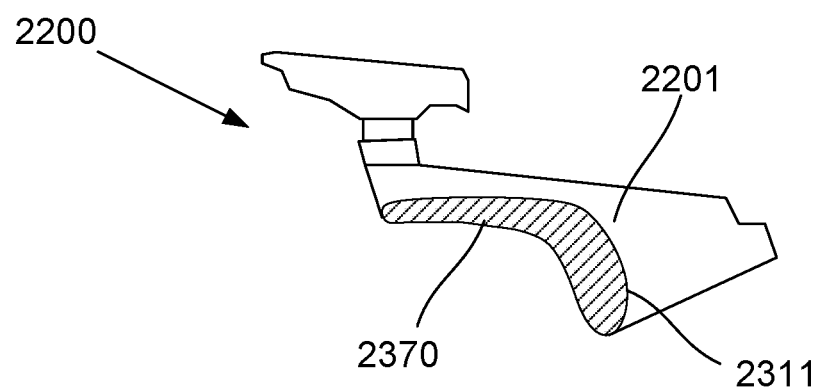
FIG. 20 is a partial schematic side view of another example of a cycle frame.

In FIG. 20, there is shown an example of a cycle frame 2200 having a fluid reservoir 2370 that is positioned underneath the top tube 2201 of a cycle frame 2200. In this example, a lower surface of the top tube 2201 includes a reservoir recess 2311 and a fluid reservoir 2370 is shaped to conform with the recess 2311 and be mounted therein. As shown in FIG. 20, the body of the fluid reservoir is shaped so that the fluid reservoir and at least part of the top tube cooperate to define an aerodynamic profile.

In the further examples shown in FIGS. 21 to 23, there are shown further possible ways in which a fluid reservoir may be integrated into a top tube of a cycle frame so as to cooperate with the top tube to define an aerodynamic profile.

In FIG. 21, there is shown a Z-frame cycle 2400 having a top tube 2401 extending between a head end and a seat mounting. The top tube 2401 may include a generally flat upper surface 2402 wherein, in use, at least a portion of upper surface 2402 abuts a lower surface 2573 of a fluid reservoir 2570. In other words, at least a portion of the fluid reservoir 2570 is adapted to be seated on the top tube 2401. In the example shown, the top tube 2401 may further includes a recess or cut-out 2404 in the upper surface 2402 thereof for receiving a part of the fluid reservoir 2570. For example, the fluid reservoir 2570 may includes a sump 2574 which is positioned in use, within the recess 2404 in the top tube 2401. The engagement between the recess 2404 and fluid reservoir 2570, for example through friction or interference fits, may further facilitate mounting of the reservoir to the frame, as well as allowing for the storage of additional fluid.

Additionally supporting or fastening arrangements can be used to aid in securing the fluid reservoir to the top tube. This can include for example, a peg or the like, provided on the top tube or underside of the reservoir, which is provided in a corresponding opening in the reservoir or top tube. Other securing mechanisms could also be used such as clips, straps, magnetic coupling or the like.

A similar arrangement is shown in FIGS. 22 and 23. In FIG. 22, there is shown a frame 2600 which forms part of Y-cycle frame. A fluid reservoir 2770 is integrated with an upper surface of the top tube 2601 such that at least a portion 2774 of the reservoir 2770 is located within a recess or cut-out 2604 in the upper surface 2602 of top tube 2601. A lower surface 2773 of the body of the reservoir 2770 is in abutment with the upper surface 2602 of the top tube 2601 such that the fluid reservoir and top tube cooperate to define an aerodynamic profile.

In FIG. 23, there is shown a traditional triangle frame 2800 including a fluid reservoir 2970 that is integrated with an upper surface of the top tube 2801 such that at least a portion 2974 (e.g. sump) of the reservoir 2970 is located within a recess or cut-out 2804 in the upper surface 2802 of top tube 2801. A lower surface 2973 of the body of the reservoir 2970 is in abutment with the upper surface 2802 of the top tube 2801 such that the fluid reservoir and top tube cooperate to define an aerodynamic profile.

Figure 24:
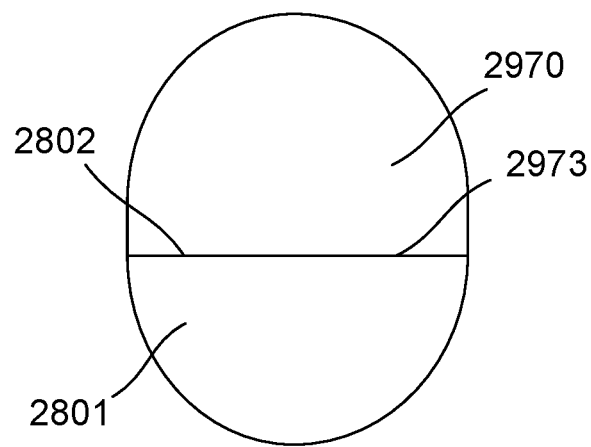
FIG. 24 is a schematic cross sectional view along the line N-N' of FIG. 23; and, FIG. 25 is a schematic cross sectional view along the line O-O' of FIG. 23.
Figure 25:
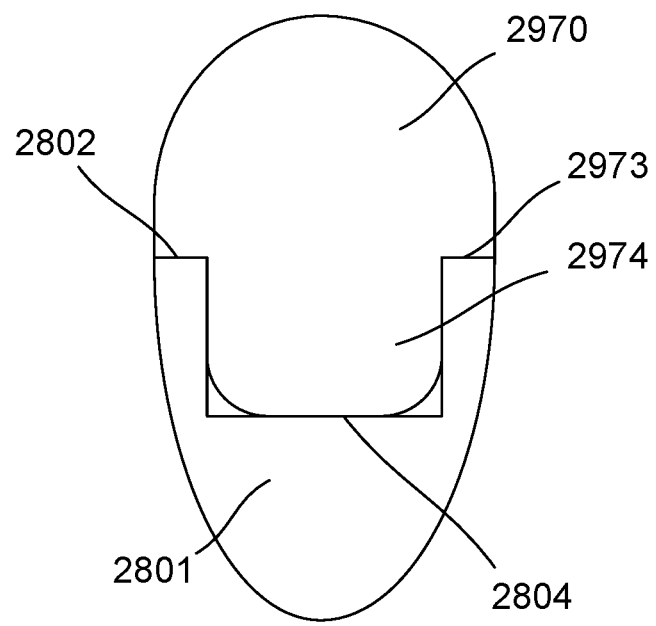

In this example, at least a part of the fluid reservoir 2970 is removably mounted within the reservoir recess 2804, in use. Further detail of the above described arrangement is shown in the sectional views of FIG. 24 and FIG. 25. In FIG. 24, the abutment between the lower surface 2973 of the reservoir and the upper surface 2802 of the top tube 2801 is shown. In FIG. 25, a sump or similar portion 2974 of the reservoir 2970 is shown removably mounted within the recess 2804 of the top tube 2801 which extends below the upper surface 2801. It will be appreciated that in the above described example at least one of the fluid reservoir and the top tube are shaped so that the fluid reservoir and at least a part of the top tube cooperate to define an aerodynamic profile.

From one or more of the previously described examples, it will be appreciated that it is advantageous to provide a fluid reservoir for a cycle frame, the cycle frame including a top tube extending from a head end to a seat mounting, the fluid reservoir including a body defining a cavity for containing a fluid, the body positioned in abutment with at least a part of the top tube in use, and wherein the body is shaped so that the fluid reservoir and the at least a part of the top tube cooperate to define an aerodynamic profile. In other examples, the top tube may be shaped so that the fluid reservoir and the at least a part of the top tube cooperate to define an aerodynamic profile.

Provision of the fluid reservoir within an aerodynamic profile of the top tube is particularly advantageous due to the proximity of the reservoir to the rider enabling fluid to be easily drawn to keep the rider properly hydrated in training or race scenarios.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

The claims defining the invention are as follows:

1. A cycle frame and fluid reservoir for a cycle frame including:
    a) a top tube extending from a head end to a seat mounting, the top tube including a reservoir recess;
    b) a connecting portion extending from one of the head end or the seat mounting to a bottom bracket mounting;
    c) a wheel mounting portion extending from the bottom bracket mounting to a wheel mounting end; and,
    d) a fluid reservoir removably mounted within the reservoir recess in use, characterised in that the fluid reservoir includes a body defining a cavity for containing a fluid, the body positioned in abutment with at least a part of the top tube in use and wherein the fluid reservoir is shaped so that the fluid reservoir and top tube cooperate to define an aerodynamic profile.

2. The cycle frame according to claim 1, wherein the reservoir recess is provided in one of:
    a) an upper surface of the top tube;
    b) a lower surface of the top tube; and,
    c) a lateral side surface of the top tube.

3. The cycle frame according to claim 1, wherein the reservoir recess extends at least one of:
    a) substantially along a length of the top tube; and,
    b) part way down the connecting portion.

4. The cycle frame according to claim 1, wherein the fluid reservoir is at least partially transparent to thereby allow fluid levels within the fluid reservoir to be observed.

5. The cycle frame according to claim 1, wherein the fluid reservoir includes a lower surface extending downwardly to define a sump so that fluid drains into the sump.

6. The cycle frame according to claim 5, wherein the reservoir includes a drinking tube extending from the fluid reservoir, the drinking tube terminating within the sump thereby allowing fluid to be removed from within the sump.

7. The cycle frame according to claim 1, wherein the fluid reservoir includes a refill port.

8. The cycle frame according to claim 7, wherein the refill port is covered by a plurality of flexibly resilient leaves which, in use, deflect out of the way to allow fluid to enter the refill port.

9. The cycle frame according to claim 7, wherein the refill port is disposed through an upper surface of the fluid reservoir.

10. The cycle frame according to claim 1, wherein the fluid reservoir includes an upper surface that aligns with at least one of:
    a) an upper surface of the top tube disposed forward of the fluid reservoir; and,
    b) an upper surface of the seat mounting disposed rearward of the fluid reservoir.

11. The cycle frame according to claim 1, wherein side walls of the fluid reservoir align with side walls of the top tube.

12. The cycle frame according to claim 1, wherein the fluid reservoir includes a lower surface that conforms with a surface of the reservoir recess.

13. The cycle frame according to claim 1, wherein the fluid reservoir is mounted within an extent of an aerodynamic profile of the frame.

* * * * *